US006015470A

United States Patent [19]

Treleaven et al.

[11] Patent Number: 6,015,470

[45] Date of Patent: Jan. 18, 2000

[54] HANGER LABEL

[75] Inventors: Carl W. Treleaven, Greensboro, N.C.; Glenn A. Grosskopf, Lake Zurich, Ill.

[73] Assignees: Pharmagraphics (Midwest), L.L.C., Itasca, Ill.; Pharmagraphics (Southeast), L.L.C., Greensboro, N.C.

[21] Appl. No.: 09/014,784

[22] Filed: Jan. 28, 1998

Related U.S. Application Data

[60] Division of application No. 08/647,466, May 3, 1996, Pat. No. 5,738,381, which is a continuation-in-part of application No. 08/533,082, Sep. 25, 1995, abandoned.

[51] Int. Cl.[7] .................... B32B 31/00

[52] U.S. Cl. .................... 156/267; 156/268; 156/269; 156/277; 156/289; 156/290; 156/291; 156/299; 156/302; 156/310; 156/324; 215/396; 215/397; 493/226

[58] Field of Search .................... 156/267, 268, 156/269, 277, 289, 290, 291, 299, 302, 310, 324; 215/396, 397; 493/226

[56] References Cited

U.S. PATENT DOCUMENTS

| | | | |
|---|---|---|---|
| 999,961 | 1/1911 | Colas | 248/498 |
| 2,135,236 | 1/1938 | Koppelman | 229/90 |
| 2,362,523 | 1/1944 | Armstrong, Jr. et al. | 215/1 |
| 2,635,604 | 1/1953 | Fredrickson | 128/272 |
| 3,016,224 | 1/1962 | Hall | 248/205 |
| 3,231,919 | 2/1966 | MacDonald | 15/174 |
| 3,387,732 | 6/1968 | Jellies | 215/100 |
| 3,593,443 | 7/1971 | Christ et al. | 40/2 R |
| 3,623,633 | 11/1971 | Kinn | 220/94 R |
| 3,635,367 | 1/1972 | Morita et al. | 215/100 A |
| 3,744,658 | 7/1973 | Fuijo | 215/100 A |
| 3,822,492 | 7/1974 | Crawley | 40/2 |
| 3,851,790 | 12/1974 | Kasper | 220/85 R |
| 3,869,333 | 3/1975 | McMaster | 428/56 |
| 3,884,443 | 5/1975 | McMaster | 248/467 |
| 3,893,495 | 7/1975 | Standifer | 150/52 R |
| 4,306,662 | 12/1981 | Sciortino et al. | 215/399 |
| 4,396,128 | 8/1983 | Larson et al. | 215/399 |
| 4,460,143 | 7/1984 | Ohama | 248/359 |
| 4,462,538 | 7/1984 | Gendron | 229/68 R |
| 4,479,838 | 10/1984 | Densirn et al. | 156/247 |
| 4,526,404 | 7/1985 | Vazquez | 283/79 |
| 4,661,189 | 4/1987 | Voy et al. | 34/62 |

(List continued on next page.)

FOREIGN PATENT DOCUMENTS

| | | |
|---|---|---|
| 0 349 670 | of 1988 | European Pat. Off. . |
| 0390952 | 6/1994 | European Pat. Off. . |
| 0356574 | 11/1994 | European Pat. Off. . |
| 1.460.738 | of 1996 | France . |
| 408 315 | of 1966 | Germany . |
| 2806391 A1 | of 1978 | Germany . |
| 3631-021 | 9/1986 | Germany . |
| 262102A1 | of 1988 | Germany . |
| 4321572 | 1/1995 | Germany . |
| 1175296 | of 1969 | United Kingdom . |
| 1309950 | of 1973 | United Kingdom . |

*Primary Examiner*—Deborah Jones
*Assistant Examiner*—Robert R. Koehler
*Attorney, Agent, or Firm*—Myers Bigel Sibley & Sajovec

[57] ABSTRACT

A label for displaying information regarding a container and suspending the container from a support, and methods for forming the same. The label includes a base label having a base adhesive on the lower surface thereof. A connector strip is secured to the upper surface of the base label along a longitudinal edge by at least one adhesive patch. A hanger is secured by the legs thereof to the connector strip. The hanger is foldable between a stored position wherein the hanger lies adjacent the upper surface of the base web and a hanging position wherein the hanger is folded away from the base label for receiving the support through the opening. A remaining portion of the upper surface of the base label is not covered by either of the connector strip and the hanger when the hanger is in the stored position. The label may further include at least one removable self adhesive secondary label forming a part thereof.

37 Claims, 20 Drawing Sheets

U.S. PATENT DOCUMENTS 4,796,937 1/1989 Andrea .
4,832,301 5/1989 Hiramoto et al. ...................... 248/359
4,847,130 7/1989 Cooper ...................................... 428/40
4,849,043 7/1989 Instance ...................................... 34/62
4,910,058 3/1990 Jameson .................................... 283/81
4,948,000 8/1990 Grabenkort ............................ 215/12.2
4,964,512 10/1990 Ingram et al. .......................... 206/459
4,964,513 10/1990 Ingram et al. .......................... 206/459
5,021,110 6/1991 Kobayashi .................................. 34/62
5,135,125 8/1992 Andel et al. ............................ 215/100
5,172,936 12/1992 Sullivan et al. .......................... 283/81
5,227,209 7/1993 Garland ..................................... 428/40
5,238,720 8/1993 Volkman ................................... 428/40
5,271,642 12/1993 Jahier et al. .............................. 283/81
5,271,787 12/1993 Hoffman et al. ............................ 34/62
5,284,363 2/1994 Gartner et al. ............................ 283/81
5,290,083 3/1994 Rissley .................................. 294/87.2
5,329,713 7/1994 Lundell ..................................... 40/310
5,350,613 9/1994 Stern et al. ............................... 428/40
5,352,155 10/1994 Fahey ........................................ 283/81
5,380,045 1/1995 Comann .................................... 283/81
5,417,365 5/1995 Lindsay ................................... 229/117
5,490,658 2/1996 Coward et al. ......................... 248/683
5,542,634 8/1996 Pomerantz ............................. 248/214
5,812,152 1/1999 Ericson ..................................... 428/42

HANGER LABEL

This is a divisional application of application Ser. No. 08/647,466, filed May 3, 1996, now U.S. Pat. No. 5,738, 381 which is a continuation-in-part of application Ser. No. 08/533,082, filed Sep. 25, 1995, now abandoned.

FIELD OF THE INVENTION

The present invention is directed to labels for identifying and displaying information regarding goods, and, more particularly, to labels of such nature which provide means for suspending the associated goods or packaging.

BACKGROUND OF THE INVENTION

In administering certain medicines and pharmaceuticals, it is necessary to suspend a bottle or other package containing the pharmaceutical product from a hanger or like support. In particular, intravenously administered fluids are typically contained in a bottle which is suspended from an extended hanger to provide gravity induced flow of the fluid.

It is highly desirable that the container be conveniently and securely suspended. While various separate and detachable harnesses into which the container may be mounted have been used, such harnesses are relatively inconvenient as they require the step of placing the container in the harness or securing the harness about the container in addition to the step of mounting the harness on the hanger. Various other supports have been developed wherein a hanging loop is more or less permanently secured to the container with the hanging loop foldable between an extended position to receive the hanger and a closed position wherein the hanging loop is flat against the bottle. Typically, the hanging loop in the closed position lies adjacent the end of the bottle, often making the container unstable when placed on end. These designs are generally formed of shrink wrapped plastic or foil. As a result, they add considerable additional cost and weight to the overall packaging.

One alternative to the above disclosed hanging and labeling means is disclosed in U.S. Pat. No. 5,135,125 to Andel et al. The Andel reference discloses a label for identifying contents of intravenous feeding bottles having formed as an integral part thereof a hanging ring for suspending the bottle from an intravenous stand. The label is built up from at least one layer of film, a layer of printing ink, and a layer of adhesive. The handle is defined in the label by a pair of die cut lines that penetrate at least the one layer of film in the label. A release coating is applied between the layer of film in the bottle and a portion of the label defined by the handle to permit the handle to be peeled away from the bottle and the remaining portion of the label. The disclosed label design suffers from several drawbacks, however. Because release coating is employed, the phenomenon commonly referred to as "adhesive lock up" may be experienced. In this case, the handle portion would be difficult to pull away from the remainder of the label, and moreover, destruction to the second layer of the label or the container to which the label is affixed may be caused. Further, the manufacturing step of applying the release coating adds time, complexity, and cost to the formation of the labels. Because the handle is formed from cuts within a continuous layer of film, there may be a tendency for the cuts to run when load is placed on the handle. Because the film layer in which the handle is defined covers the entire surface of the label, it is relatively difficult to access an edge of the handle by which to peel it up. Where the handle is printed on, care must be taken to properly configure the print in the handle, disposed on the handle layer but outside of the handle, and disposed on the underlying layer, if any, to ensure that no indicia which is intended to be seen when the handle is either up or down, is obfuscated or separated.

Thus, there exists a need for a label for identifying and displaying information regarding an article which provides means for suspending the article. There exists a need for such a label which overcomes the drawbacks and deficiencies of the prior art. There exists a need for such a label which may be conveniently and cost effectively manufactured. Further, there exists a need for a method and apparatus for forming such labels.

SUMMARY OF THE INVENTION

The present invention is directed to a label for displaying information regarding a container and suspending the container from a support. The label includes a base label having a longitudinal edge, an upper surface and a lower surface. A base adhesive is disposed on the lower surface for affixing the label to the container. A hanger is provided having at least two interconnected legs defining an opening therebetween, each of the legs having a respective end. A connector strip is substantially permanently secured to the upper surface of the base label along the longitudinal edge by at least one adhesive patch. Each of the ends of the legs is secured to the connector strip. The hanger is foldable about the ends between a stored position wherein the hanger lies adjacent the upper surface of the base web and a hanging position wherein the hanger is folded away from the base label for receiving the support through the opening. A remaining portion of the upper surface of the base label is not covered by either of the connector strip and the hanger when the hanger is in the stored position.

In one embodiment of the label as described above, the hanger has a lower surface and, when the hanger is in the stored position, the lower surface of the hanger directly engages the upper surface of the base label. In another embodiment, the hanger has a lower surface facing the upper surface of the base label when the hanger is in the stored position, the lower surface of the hanger coated with a hanger adhesive, and the hanger adhesive coated with an adhesive deadener.

Preferably, the connector strip is the sole means for attaching the hanger to the base label. In some embodiments, a release varnish coating is disposed on a portion of the remaining portion of the upper surface of the base label and at least partially surrounds the at least one adhesive patch.

Indicia may be disposed on the upper surface of the base label. More particularly, at least a portion of the indicia may underlie the hanger when the hanger is in the stored position, the hanger being formed from a transparent material, whereby the at least a portion of the indicia is visible through the hanger when the hanger is in the stored position. Moreover, a printable region may form a part of the remaining portion, the printable region adapted for printing indicia thereon.

A plurality of stress relief curves may be formed on the connector strip, each of the stress relief curves disposed adjacent a respective one of the ends. Preferably, the hanger includes a pull tab extending therefrom. Further, the base label preferably includes a base tab extending therefrom and underlying the pull tab when the hanger is in the stored position, the base tab including a margin extending beyond the pull tab when the hanger is in the stored position. Alternatively, a base tab may underlie the pull tab and have a periphery coextensive with the pull tab, the base tab being separable from the base label and secured to at least a portion of the pull tab by a tab adhesive.

The connector strip preferably includes a plurality of foot portions, the foot portions defining at least one gap therebetween, the gap disposed adjacent an interior area defined between two of the legs. A release varnish coating may be disposed in the gap.

In some embodiments, the number of the legs is equal to the number of the foot portions. In other embodiments, at least two of the legs are secured to a common one of the foot portions. In one embodiment, the label includes three legs, the distance between adjacent legs being about one third of a prescribed circumference of the container. In another embodiment, the label includes four legs, a first pair of the legs joined to one another and a second pair of legs joined to one another, the first and second pairs of legs interconnected by a cross leg.

The present invention is further directed to a label for displaying information regarding a container and suspending the container from a support including a base label having an upper surface and a lower surface. A base adhesive is disposed on the lower surface for affixing the label to the container. A hanger is secured to the upper surface of the base label. The hanger is foldable between a stored position wherein the hanger lies adjacent the upper surface of the base label and a hanging position wherein the hanger is folded away from the base label for receiving the support through an opening formed therein. At least one removable self-adhesive secondary label forms a part of the base label.

In one embodiment of the label including at least one self adhesive secondary label as described above, the base label includes a first layer having an upper surface and a lower surface, and a second layer adhered to the upper surface of the first layer. The base adhesive is disposed on the lower surface of the first layer. The secondary label forms a part of the second layer and is releasably adhered to the upper surface of the first layer by a second adhesive layer. In an alternative embodiment, a portion of the base adhesive is partially coated with adhesive deadener, the portion of the base adhesive underlying the secondary label. In yet another embodiment, a portion of the base adhesive is substantially fully coated with a layer of adhesive deadener. A second adhesive layer is disposed on the layer of adhesive deadener. The portion of the base adhesive underlies the secondary label.

The present invention is further directed to a method for forming a label for displaying information regarding a container and suspending the container from a support. The method includes providing a base web having an upper surface, a lower surface, and a base adhesive coating the lower surface thereof. A release varnish is selectively applied to the upper surface of the base web. A top web having a lower surface and an adhesive strip coating a portion of the lower surface of the top web is married to the base web such that the adhesive strip engages the varnish on the upper surface of the base web. The top web is cut down to the base web to form a hanger therein. The base web is cut through to form a base label therein.

The method may further include the step of applying the adhesive strip to the top web prior to marrying the top web to the base web. A top web waste matrix may be removed following the step of cutting the top web. In particular, the step of cutting the top web to form the hanger may include forming a hanger having at least two spaced apart legs, in which case the step of removing the top web waste matrix includes removing an interior waste portion forming a part of the top web and defined between the legs of the hanger. Moreover, the step of cutting the top web may further include forming a continuous longitudinal strip forming a part of the top web, and a gap portion forming a part of the top web and defined between ends of the legs. The interior waste portion is connected to the continuous strip by the gap portion. In this case, the step of removing the top web waste matrix includes pulling the continuous strip await from the base web, whereby the interior waste portion is pulled away therewith. The method may further include the step of removing a base web waste matrix following the step of cutting the base web. Also, a step of printing on the base web may be practiced.

The present invention is directed to a further method for forming labels as described above. The further method includes providing a base web having an upper surface, a lower surface, and an adhesive coating on the lower surface thereof. An adhesive patch is selectively applied to one of the upper surface of the base web and a lower surface of a top web. The base web is married with the top web such that the lower surface of the top web engages the upper surface of the base web. The top web is cut down to the base web to form a hanger therein. The base web is cut through to form a base label therein.

The step of selectively applying the adhesive patch may include screen printing the adhesive patch onto the upper surface of the base web. The method may further include the step of removing a top web waste matrix following the step of cutting the top web. Further, the step of removing the top web waste matrix may be practiced as in the first described method. The present method may include a step of removing a base web waste matrix following the step of cutting the base web and/or a step of printing on the base web, as described with respect to the first method.

The present invention is also directed to another further method for forming a label as discussed above. The method includes providing a base web having an upper surface, a lower surface, and an adhesive coating on the lower surface thereof. An adhesive patch is applied to at least one of the upper surface of the base web and a connector strip forming a part of a pre-formed hanger/connector strip piece. The pre-formed piece is applied to the base web such that the connector strip is adhered to the upper surface of the base web by the adhesive patch. The base web is cut through to form a base label therein.

The method may further include the step of removing a base web waste matrix following the step of cutting the base web and/or the step of printing on the base web. The pre-formed hanger/connector strip piece may be applied to the upper surface of the base web using automatic application equipment. Alternatively, the pre-formed hanger/connector strip piece may be applied to the upper surface of the base web by hand. The adhesive patch may be screen printed onto the upper surface of the base web. A plurality of adhesive patches for each hanger/connector strip piece may be applied to one of the upper surface of the base web and a plurality of foot portions forming a part of the connector strip.

The present invention is directed to yet another method for forming a label as described above. The method includes providing a base web having an upper surface, a lower surface, and a base adhesive coating the lower surface thereof. A release varnish is selectively applied to the upper surface of the base web. A top web is provided having a lower surface, a second adhesive layer disposed on the lower surface of the top web. An adhesive deadener is selectively applied to a portion of the second adhesive. The base web and the top web are married such that the lower surface of the top web faces the upper surface of the base web, the second adhesive layer being interposed therebetween. The top web is cut down to the base web to form a hanger therein. The base web is cut through to form a base label therein.

The method may further include the step of removing a top web waste matrix following the step of cutting the top web. Further, the step of removing the top web waste matrix may be practiced as in the first described method. Also, the present method may include the steps of removing a base web waste matrix following the step of cutting the base web and/or printing on the base web, as described with respect to the first method.

An object of the present invention is to provide a label for identifying and displaying information regarding goods contained in a package such as a bottle.

An object of the present invention is to provide such a label which includes means for suspending the associated goods or packaging.

A further object of the present invention is to provide a label as described above which will support relatively large loads.

Moreover, an object of the present invention is to provide a label as described above which may be conveniently and cost effectively manufactured.

Yet another object of the present invention is to provide a method and apparatus for forming labels as described above.

The preceding and further objects of the present invention will be appreciated by those of ordinary skill in the art from a reading of the Figures and the detailed description of the preferred embodiment which follow, such description being merely illustrative of the present invention.

DETAILED DESCRIPTION OF THE PREFERRED EMBODIMENTS

Figure 1:
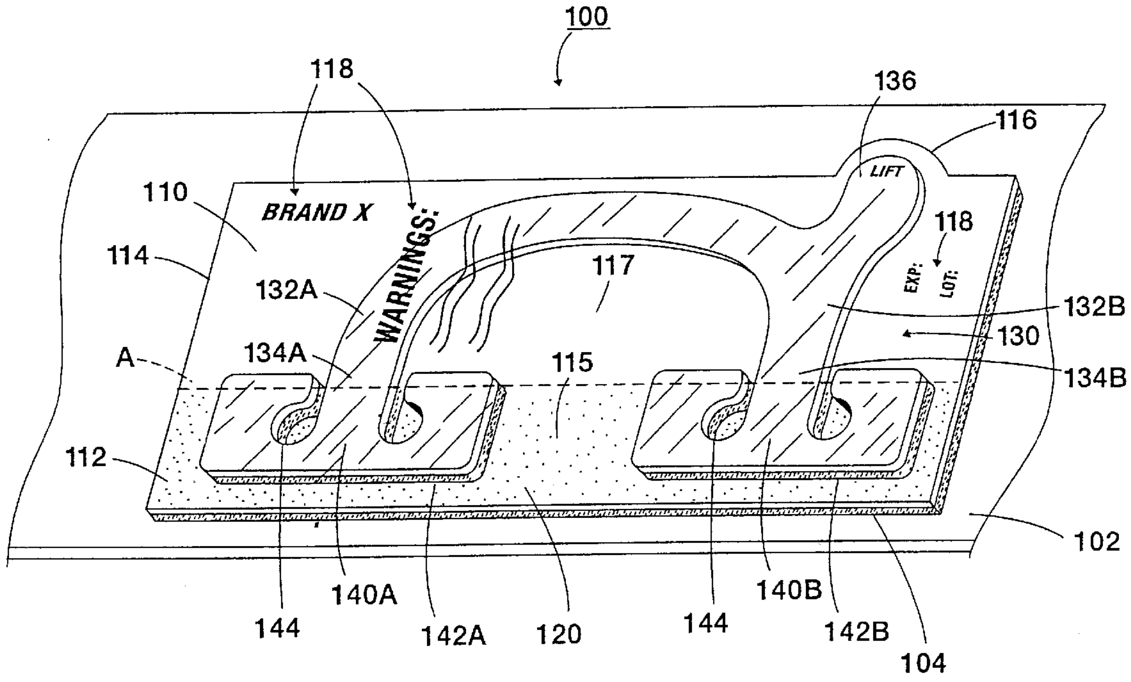
FIG. 1 is a perspective view of a first embodiment of the hanging label according to the present invention disposed on a release liner.
Figure 2:
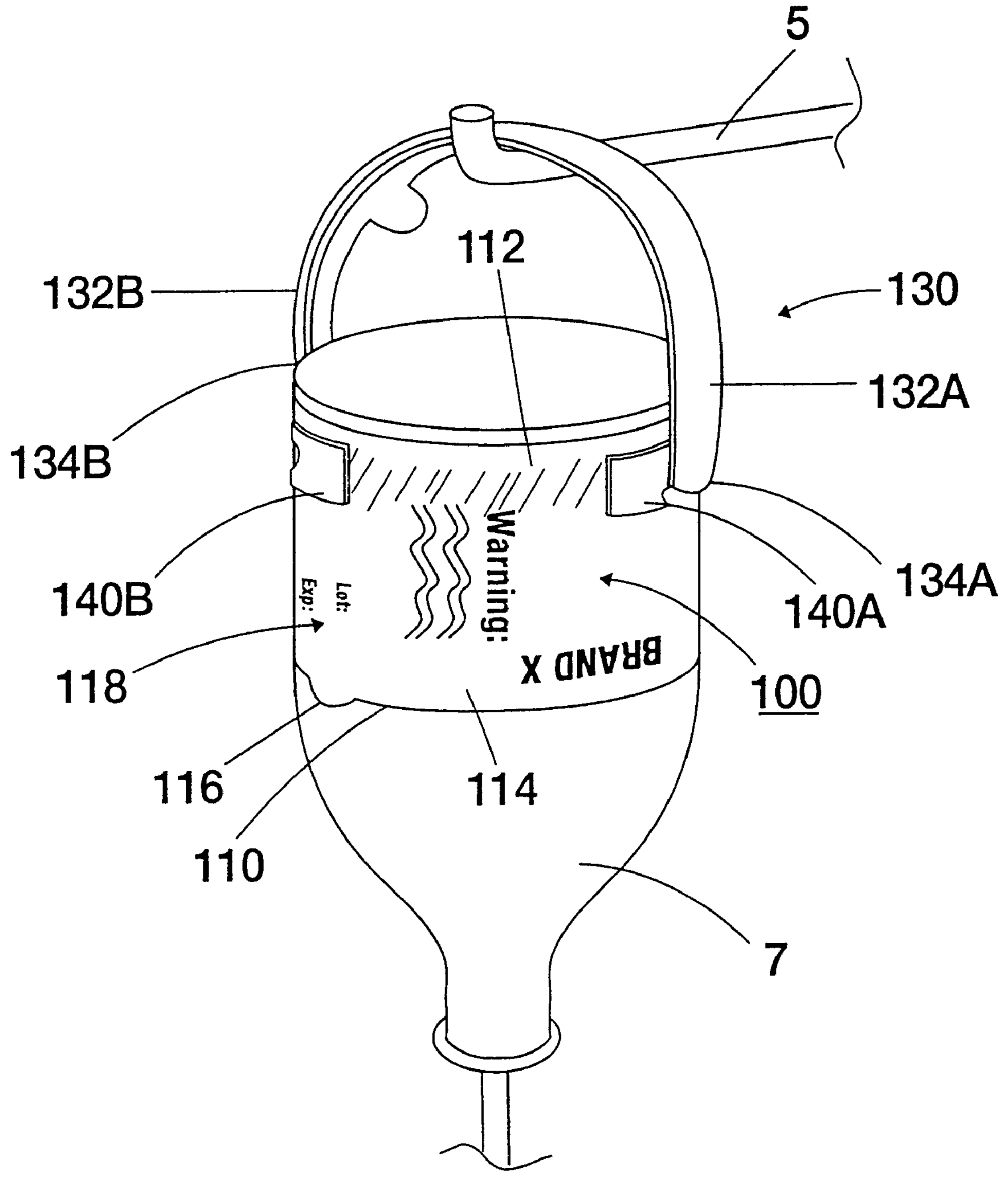
FIG. 2 is a perspective view of a label according to the first embodiment affixed to a container and suspended by the hanger thereof from a support.

With reference to FIGS. 1 and 2, a label 100 according to a first embodiment of the present invention is shown therein. As shown in FIG. 1, label 100 is releasably secured to a release liner 102 by adhesive 104. Label 100 may be removed from release liner 102 and applied to a suitable container 7 as shown in FIG. 2 by conventional means including, for example, automatic applicator equipment. Once affixed to container 7 by means of adhesive 104, label 100 will serve by means of indicia 118 to display information regarding container 7 and its contents. Further, hanger 130 forming a part of label 100 may be folded away from base 110 and container 7 whereupon it may be looped over a suitable support 5 for suspending container 7.

Turning to label 100 in greater detail, base label 110 may be formed from any suitable film or paper stock. Further, base label 110 may be formed from a self adhesive pressure sensitive web or, as an alternative, the pressure sensitive material may be applied to the undersurface of the stock or to the upper surface of the release liner, the release liner and stock thereafter being married. Suitable materials for base label 110 include product number 72828 2 mil white film face stock with S-333 emulsion adhesive with a 50 pound liner available from Fasson of Paineville, Ohio. Suitable indicia 118 such as brand names, warnings, and lot and expiration data are printed on the upper surface of base label 110. Preferably, base label 110 also has a coating of alcohol resistant varnish on the upper surface thereof to resist destruction by abrasion and chemical exposure. Tab 116 is provided extending from an edge of base label 110 and underlying pull tab 136 of hanger 130. Notably, because the hanger and foot portions do not cover the entire upper surface of the base label, users of the label may apply further indicia. For example, a product manufacturer may wish to print suitable data adjacent the "LOT:" and "EXP:" indicia. The upper surface of the base label adjacent these indicia is preferably formed from or coated with a suitable material for facilitating printing, such materials being well known in the art.

The upper surface of base label 110 is divided into adhesive zone 112 and non-adhesive zone 114 by imaginary line A. Interior area 117 of the upper surface of base label 110 is defined between legs 132A and 132B and above line A. A further varnish layer 120 is disposed on the upper surface of base label 110 throughout adhesive zone 112 except in the areas underlying foot portions 140A, 140B. To the extent that there is misregistry between the locations of varnish coating 120, the border between adhesive zone 112 and non-adhesive zone 114, and foot portions 140A, 140B, varnish coating 120 preferably overlaps into those other areas. Varnish 120 is a release varnish which allows adhesive to be removed from the upper surface of base label 110. Suitable varnishes include Paragon L075 varnish, available from Paragon Ink of Connecticut. The significance of zones 112 and 114 and varnish 120 will be discussed hereinafter. Varnish 120 may also be present underneath the portions of foot portions 140A, 140B extending between the bottoms of cutouts 144 and line A. If so, it may be desirable to apply adhesive deadener to the adhesive at these portions so that the adhesive will not interfere with handling when the hanger is in the hanging position, thus exposing the adhesive.

Hanger 130 and foot portions 140A, 140B are preferably formed from polyester face stock or polypropylene film. More particularly, 4 or 5 mil polyester film, or 6 mil Valeron film available from Van Leer Films of Houston, may be used. Hanger 130 includes legs 132A and 132B which terminate in ends 134A and 134B, respectively. Ends 134A and 134B are integral with, and preferably unitarily formed with, foot portions 140A and 140B, respectively. Foot portions 140A and 140B are substantially permanently adhered to the upper surface of base label 110 by adhesive patches 142A and 142B. Adhesive patches 142A and 142B extend up to border line A. Varnish coating 120 is present in the gap 115 between foot portions 140A and 140B. Notably, gap 115 lies adjacent interior area 117. Stress relief cutouts 144 are formed in each of foot portions 140A and 140B. Film material may be provided within cutouts 144 as well, in which case the stress relief curves will be formed by cut lines in the foot portions. Pull tab 136 extends upwardly from hanger 130 and is integrally formed with, and preferably unitarily formed with, hanger 130.

Hanger 130 is transitioned from the stored position of FIG. 1 to the hanging position of FIG. 2 by grabbing pull tab 136 and lifting hanger 130 up and away from base label 110. Legs 132A and 132B fold about ends 134A and 134B, respectively. The distance between the ends of the legs is preferably chosen such that the ends will be disposed diametrically opposite one another when the label is affixed to a container of a prescribed circumference. Stress relief cutouts 144 serve to prevent the material of foot portions 140A, 140B from tearing.

Figure 3:
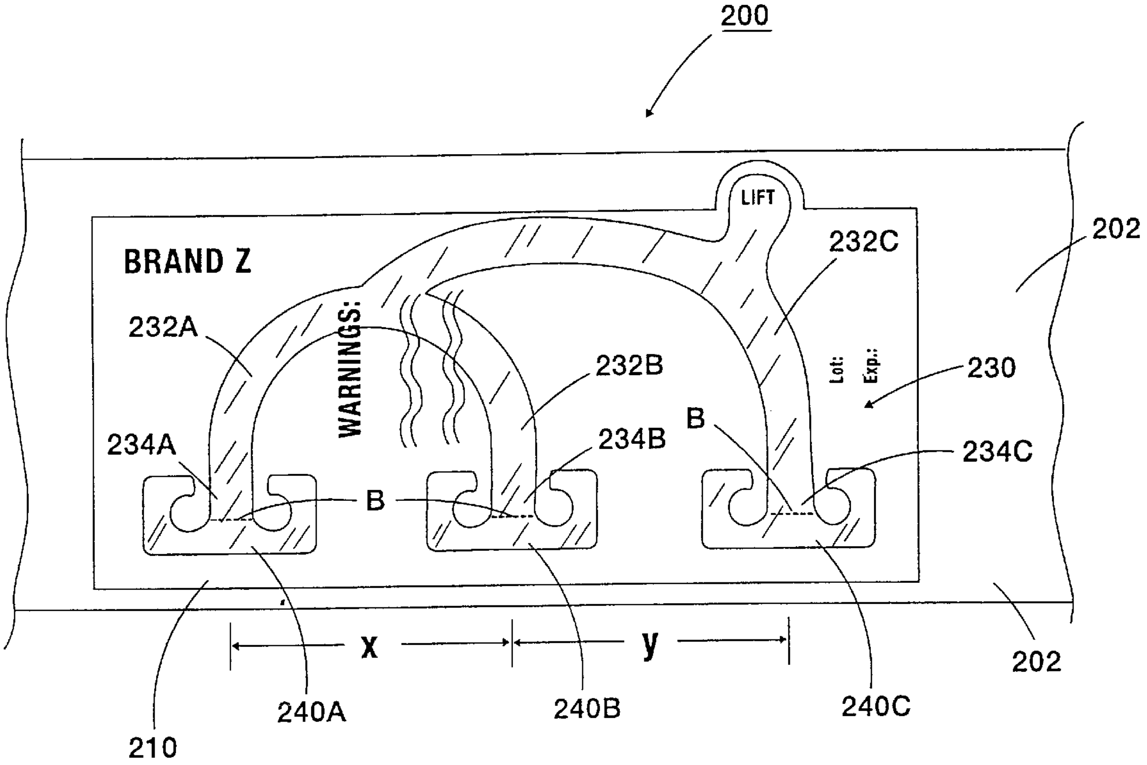
FIG. 3 is a top plan view of a label according to a second embodiment disposed on a release liner.

With reference to FIG. 3, a label 200 according to a second embodiment of the present invention is shown therein. Label 200, disposed on release liner 202, is substantially the same as label 100 of the first embodiment except in two respects. First, there is no varnish corresponding to varnish 120. Second, hanger 230 of label 200 is of a three-legged design. More particularly, hanger 230 includes legs 232A, 232B, and 232C having ends 234A, 234B, and 234C, respectively. Ends 234A, 234B, and 234C terminate in foot portions 240A, 240B, and 240C, respectively. Foot portions 240A, 240B, and 240C are substantially permanently adhered to the upper surface of base label 210 by adhesive patches (not shown). Preferably, the adhesive patches terminate proximate the dotted lines indicated as B. Preferably, the distance between end 230A and end 230B (denoted as dimension X) and the distance between end 234B and end 234C (denoted as dimension Y) are the same. Further, the sum of dimensions X and Y is preferably equal to ⅔ of the circumference of the container 7 to which the label 200 is to be applied.

Figure 4:
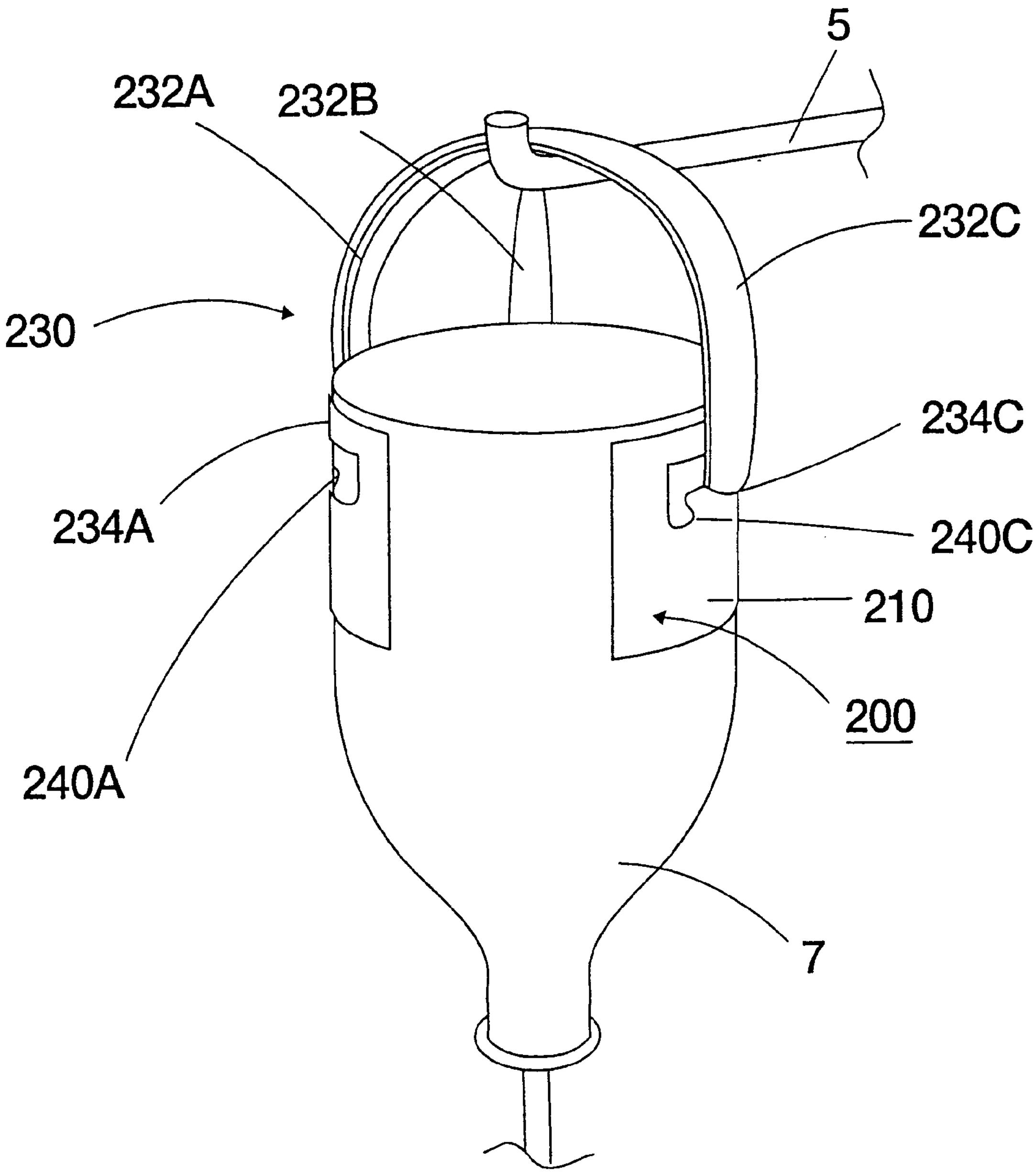
FIG. 4 is a perspective view of the label according to the second embodiment affixed to a container and suspended by the hanger thereof from a support.

Turning to FIG. 4, it will be seen that hanger 230 is transitioned from the stored position to the hanging position in the same manner as hanger 130 of the first embodiment. It will be appreciated that the three-legged design is more easily balanced on support 5. Further, because the weight of container 7 is distributed over three legs rather than two, a greater load may be supported by label 200. Also, if support 5 is disposed between legs 232A and 232B and either leg 232B or leg 232C breaks, or if support 5 is disposed between legs 232B and 232C and either leg 232A or leg 232B breaks, the container will not fall, but rather will be supported by the remaining two legs.

Figure 5:
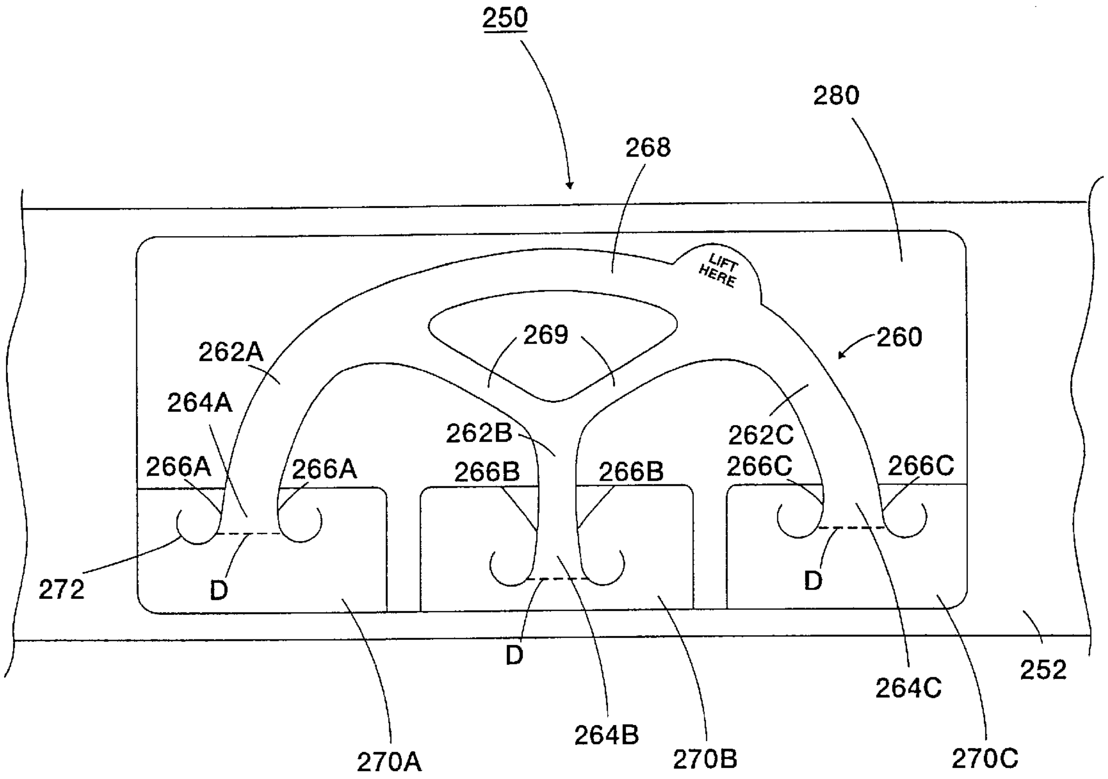
FIG. 5 is a top plan view of a label according to a third embodiment disposed on a release liner.

With reference to FIG. 5, a label 250 according to a third embodiment is shown therein disposed on release liner 252. Label 250 is substantially similar to label 200 of the second embodiment except in three respects. First, foot portions 270A, 270B, and 270C extend to the lower and side edges of base label 280. Second, hanger 260 includes connecting portions 268 and 269 defining an opening therebetween for receiving the support. Thirdly, each of legs 262A, 262B, and 262C include a portion defined by cut lines formed in foot portions 270A, 270B, and 270C, respectively. More particularly, cut lines 266A, 266B, and 266C form a lower portion of legs 262A, 262B, and 262C. Legs 262A, 262B, and 262C terminate at ends 264A, 264B, and 264C. Preferably, adhesive (not shown) underlies substantially all of foot portions 270A, 270B, and 270C except for the portions defined within the aforementioned cut lines above lines indicated by dotted lines D.

Figure 6:
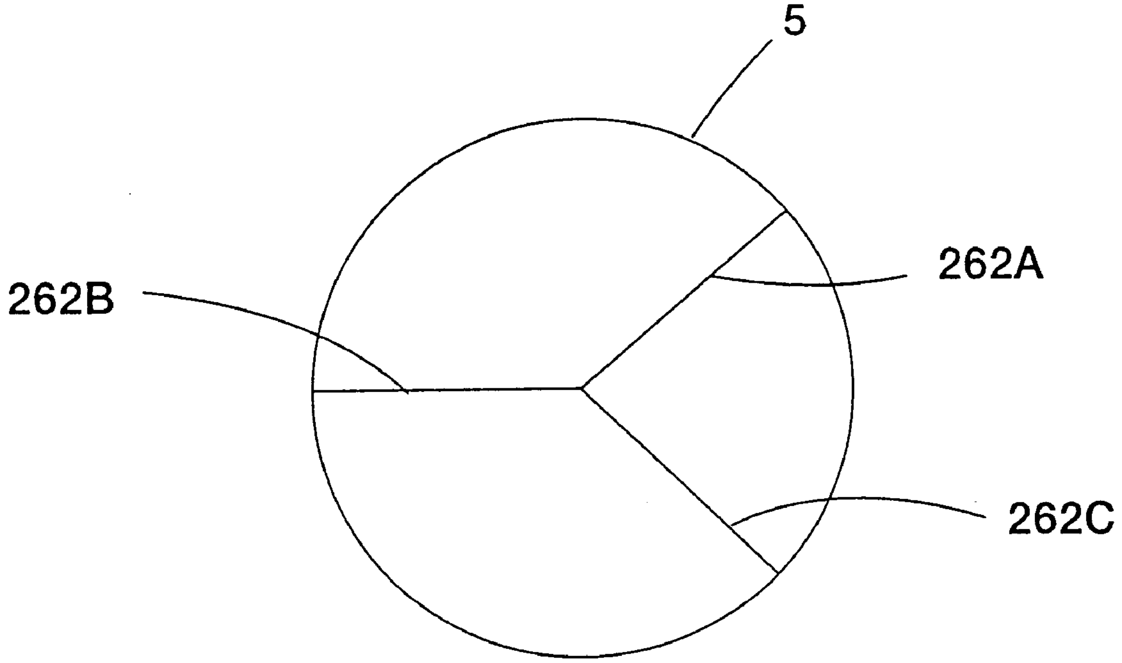
FIG. 6 is a schematic, top view of the label according to the third embodiment affixed to a container with the hanger thereof in an operative position.

It will be appreciated that, when hanger 260 is lifted away from base label 280, the portions of the legs defined by the cut lines in the foot portions will separate from the base label as well. Again, stress relief curves 272 serve to prevent tearing of the foot portions. Schematic FIG. 6 shows the preferred locations of legs 262A, 262B, and 262C when mounted on a container 5 of a prescribed circumference.

Figure 7:
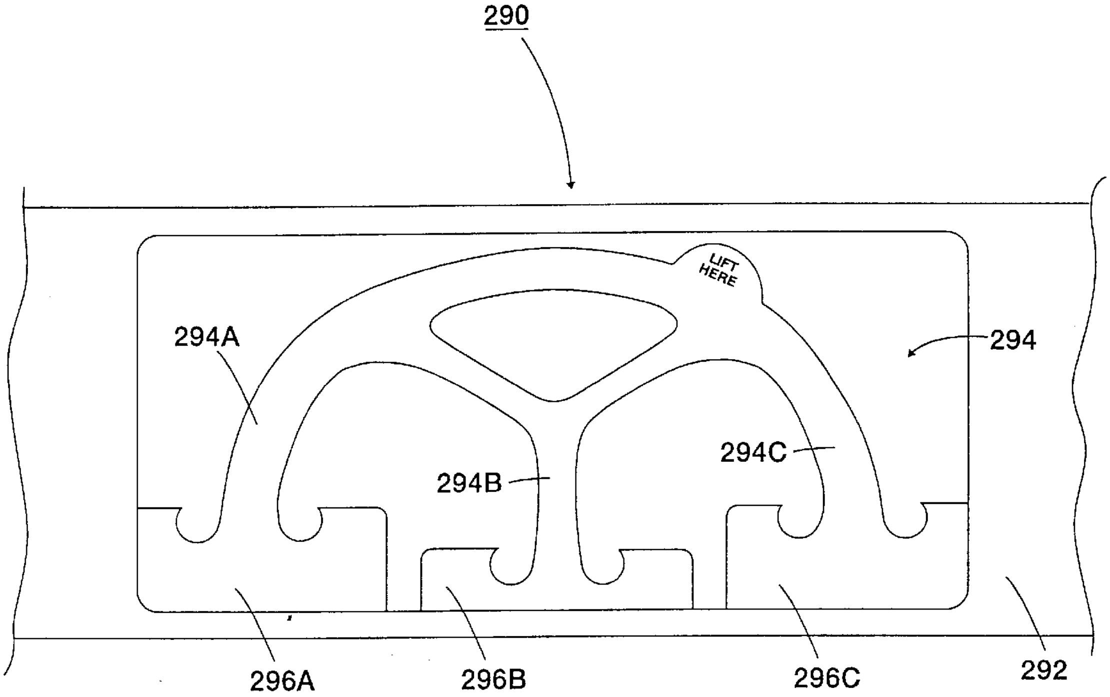
FIG. 7 is a top plan view of a label according to a fourth embodiment disposed on a release liner.

FIG. 7 shows a label 290 according to a fourth embodiment disposed on release liner 292, label 290 being a variation of label 250. Label 290 includes hanger 294 having legs 294A, 294B, 294C formed substantially as in the first and second embodiments and configured as in the third embodiment. Foot portions 296A, 296B, 296C are formed substantially as in the first and second embodiments except that foot portion 296B is reduced in size as compared with the other foot portions.

Figure 8:
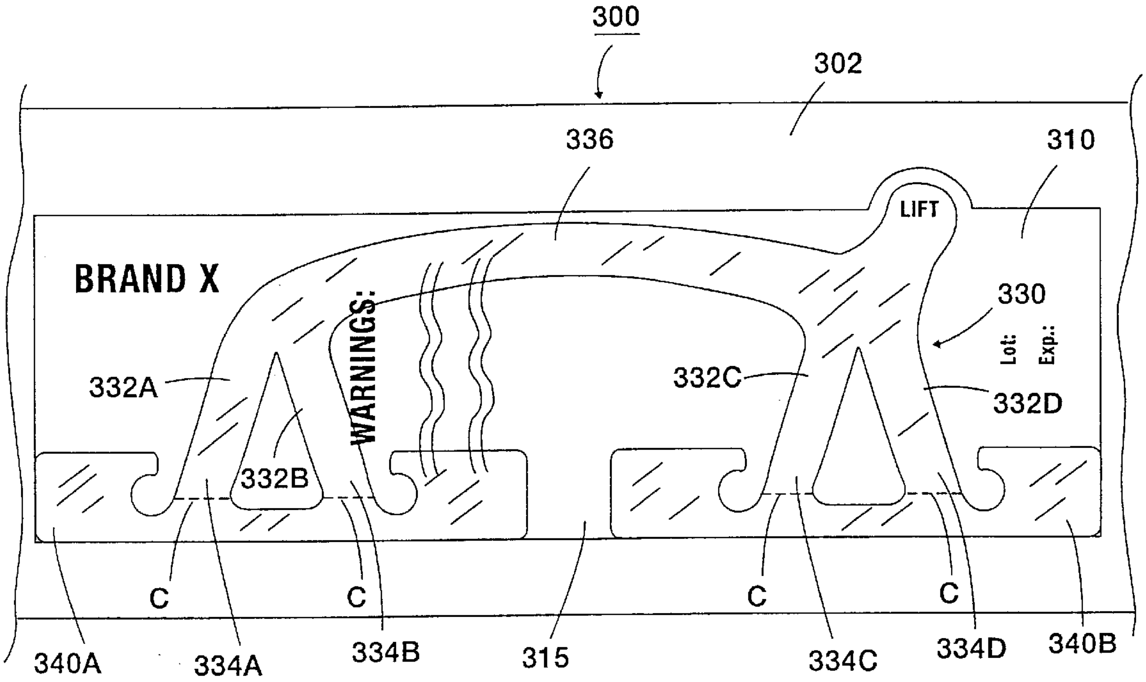
FIG. 8 is a top plan view of a label according to a fifth embodiment of the present invention disposed on a release liner.

Turning to FIG. 8, a label 300 according to a fifth embodiment is shown therein disposed on release liner 302. Label 300 is substantially similar to label 200 of the second embodiment except in three respects. First foot portions 340A and 340B extend to the lower and side edges of base label 310. Second, hanger 330 includes four legs 332A, 332B, 332C, and 332D as well as a central connecting portion 336. Thirdly, two legs terminate into each of foot portions 340A and 340B. The adhesive patches (not shown) underlying each of foot portions 340A and 340B preferably have upper edges in the vicinity of ends 334A, 334B, 334C, and 334D located as indicated by dotted lines C.

It will be appreciated that hanger 330 may be transitioned from the stored position as shown in FIG. 8 to a hanging position in the same manner as hanger flaps 130 and 230.

Hanger flap 330 would then be looped over support 5 such that it is disposed between legs 332B and 332C. Again, this design provides greater load resistance and security than a two-legged hanger.

Figure 9:
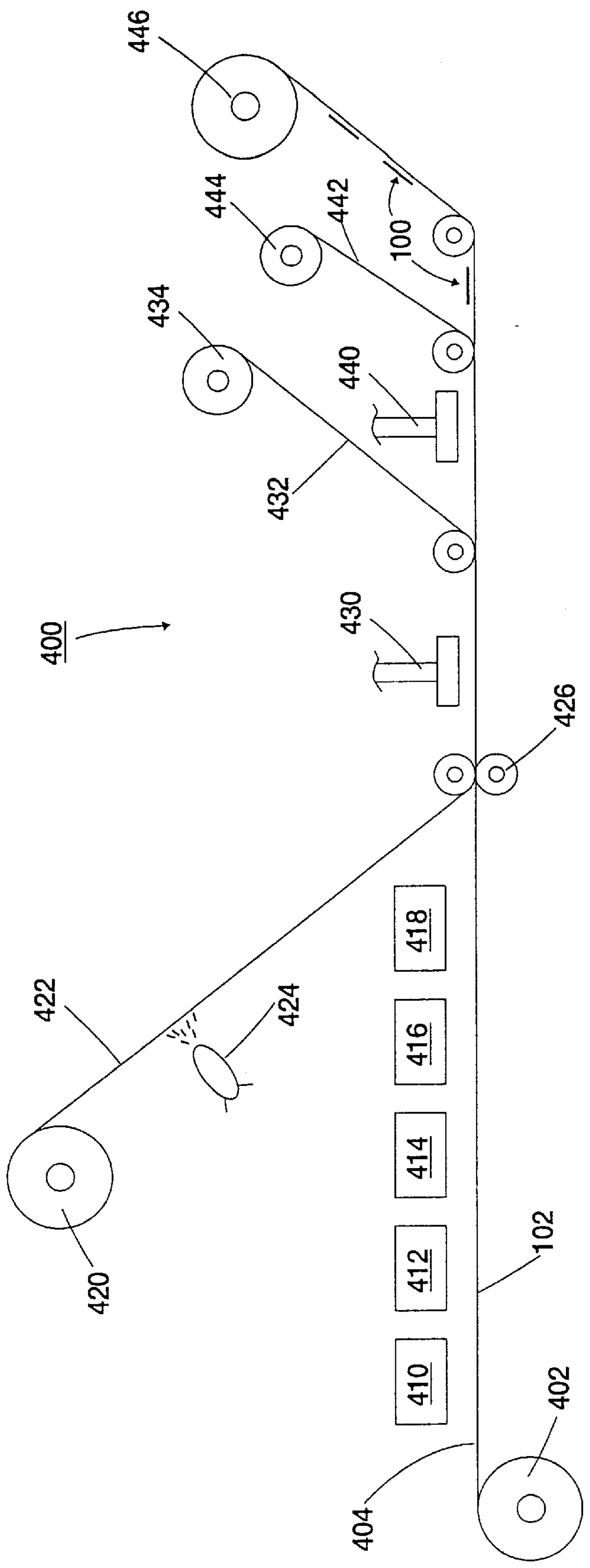
FIG. 9 is a schematic diagram showing an apparatus for forming labels of the present invention according to a first method.

With reference to FIG. 9, an apparatus for forming labels 100 according to the first embodiment is shown schematically therein. Apparatus 400 may include, for example, a Mark Andy 2200 Flexopress available from Mark Andy, Inc. of Chesterfield, Mo. Alternatively, rotary letter press, lithographic printing, silk screen, or gravure may be used.

First, a web of pressure sensitive film or paper 404 is unwound from unwind-station 402. Preferably, web 404 includes a release liner and a stock web adhered thereto by a pressure sensitive adhesive. Alternatively, base web 404 may be formed by applying adhesive to the underside of a stock web on line prior to marrying the stock web to the release liner. The stock material and pressure sensitive adhesive correspond to base label 110 and adhesive 104 of the finished labels 100. Web 404 is passed through one or more print stations at which indicia 118 is applied to the upper surface of the web Alcohol resistant varnish is applied at varnish station 412 and cured at curing station 414. Release varnish 120 is applied at varnish station 416 and cured at curing station 418. More particularly, varnish applying station 416 applies varnish in the areas of base web 404 corresponding to non-adhesive zone 112 in a pattern excluding the portions corresponding to feet 140A and 140B.

A web of non-pressure sensitive face stock 422 is unwound from unwind station 420. Web 422 corresponds to hanger 130 and foot portions 140A, 140B of label 100. As discussed above, web 422 is preferably formed from a polyester or polypropylene film. Adhesive applicator 424 applies adhesive to the underside of web 422. Adhesive applicator 424 is preferably a slot coater as available from Nordson Corporation of Atlanta. Adhesive applicator 424 forms a continuous, longitudinal band on the underside of web 422 corresponding to adhesive zone 112 of label 100. That is, adhesive applicator 424 forms a band of adhesive along one side edge of the web 422 while leaving a non-adhesive band adjacent the other side of the web. Webs 422 and 404 are married at nip rollers 426. The adhesive applied by adhesive applicator 424 serves to adhere the lower portion of web 422 to the upper surface of web 404. More particularly, the portions of web 422 corresponding to foot portions 140A and 140B are permanently secured to the non-release varnish coated portions of base web 404. The remainder of the adhesive on the underside of web 422 is releasably secured to the release varnish coated portions of base web 404.

Thereafter, die cutter 430 forms cut lines in web 422 down to base web 404 defining hanger 130 and foot portions 140A, 140B. Upper waste matrix 432 consisting of the portions of web 422 and the adhesive thereon not lying within hanger 130 and foot portions 140A, 140B is pulled away by winding station 434. Release varnish 120 allows the adhesive on the undersurface of web 422 to be released from base web 404 and removed with the waste matrix. Notably, release varnish coated gap 115 connects the continuous portion of the waste matrix below the foot portions to the portion of the waste matrix defined between legs 140A and 140B (i.e., overlying interior area 117). In this way, the entire waste matrix of web 422 outside of hanger 130 and foot portions 140A, 140B may be removed as a continuous piece, thereby allowing continuous removal.

Thereafter, base labels 110 are formed by die cutter 440 which forms die cuts through base web 404 down to release liner 102. The waste matrix 442 of base web 404 is removed by winding station 444. The resulting labels 100 disposed on release liner 102 may thereafter be wound onto winding station 446 or sheeted and stacked.

It will be appreciated that the method and apparatus as discussed with regard to FIG. 9 may be used to form labels having two, three, four, or more legs. Thus, the hanger and foot portion configurations of label 200 according to the second embodiment, label 250 according to the third embodiment, label 290 according to the fourth embodiment, and label 300 according to the fifth embodiment may be incorporated into labels otherwise as described with regard to label 100 of the first embodiment.

In some cases, it may be feasible to dispense with the use of the release varnish. This may be possible in cases where the adhesive is not allowed sufficient time to set, and can therefore be stripped away before it becomes permanently adhered to the base web.

Figure 10:
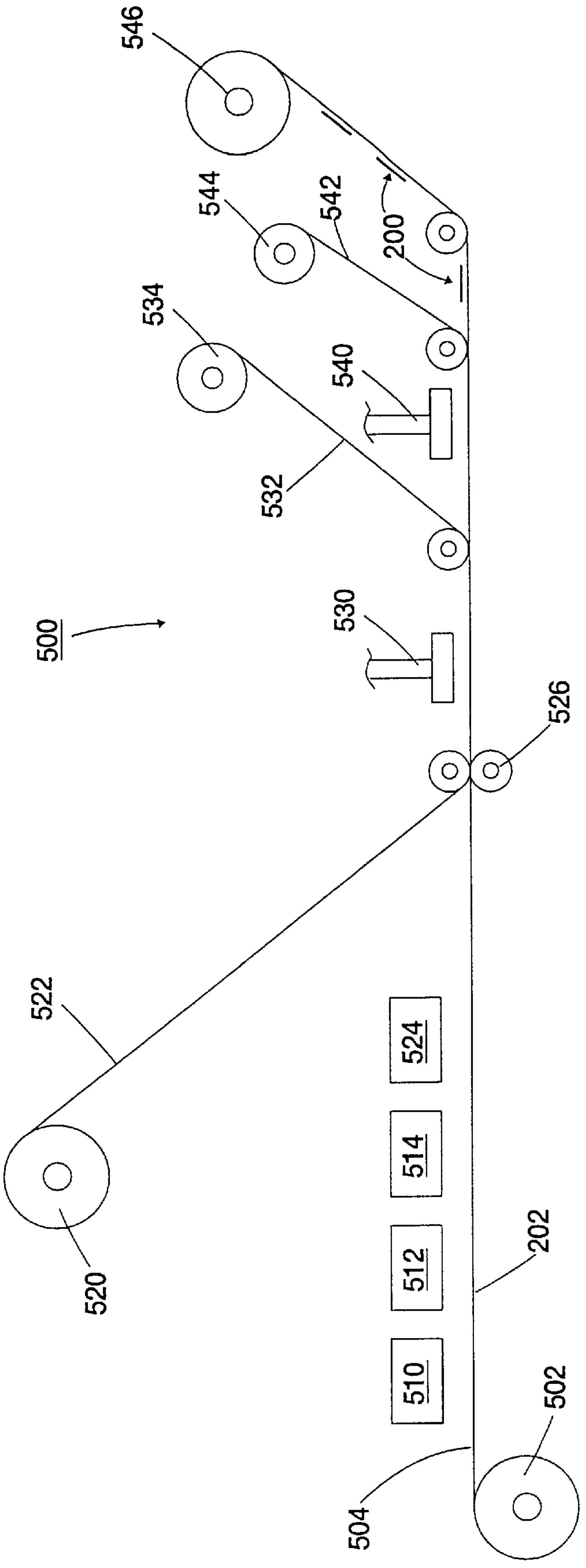
FIG. 10 is a schematic diagram of an apparatus for forming labels of the present invention according to an alternative method.

Turning to FIG. 10, an apparatus 500 for forming labels according to a second method of the present invention is shown therein. Each of labels 200, 250, 290, and 300 may be formed according to the second method, and moreover, labels having a hanger and foot portion configuration as in label 100 of the first embodiment may be formed using the second method as well. First, a base web 504 corresponding to base web 404 is unwound from unwinding station 502. Suitable indicia is printed on the upper surface of base web 504 by one or more printing stations 510. Thereafter, protective varnish is applied at varnish applying station 512 and cured at curing station 514.

In the second method, the slot coater of apparatus 400 of the first method is replaced with an adhesive screen printer 524. The screen printer is capable of laying down a defined pattern of adhesive in a desired shape and size. Suitable screen printers are available from Nordson Corporation. Screen printer 524 as shown in FIG. 10 applies a pattern of adhesive on the upper surface of base web 504 in a configuration and locations corresponding to the adhesive patches under foot portions 240A, 240B, and 240C. Alternatively, an adhesive screen printer could be used to apply the same pattern of adhesive to the underside of web 522 in the same relative locations. In either case, web 522 corresponding to web 422 is unwound from unwind station 520 and married with base web 504 by nip rollers 526. As in the first method, die cutter 530 forms die cuts defining hanger 230 and foot portions 240A, 240B, and 240C. The waste matrix 532 of web 522 is removed by winding station 534. Notably, as there is no adhesive except underlying foot portions 240A, 240B, 240C, waste matrix 532 comes up easily. Again, because of the provision of gaps between the respective foot portions connecting the regions of the top web defined within the hangers, waste matrix 532 will come up as a continuous web. After hangers 230 and the foot portions are formed as discussed above, die cutter 540 forms; cut lines in base web 504 down to release liner 202 to define base labels 210. The waste matrix of base web 504 is taken up by winding station 544 and the resulting labels may be wound onto a roll by winding station 546 or sheeted and stacked.

Figure 11:
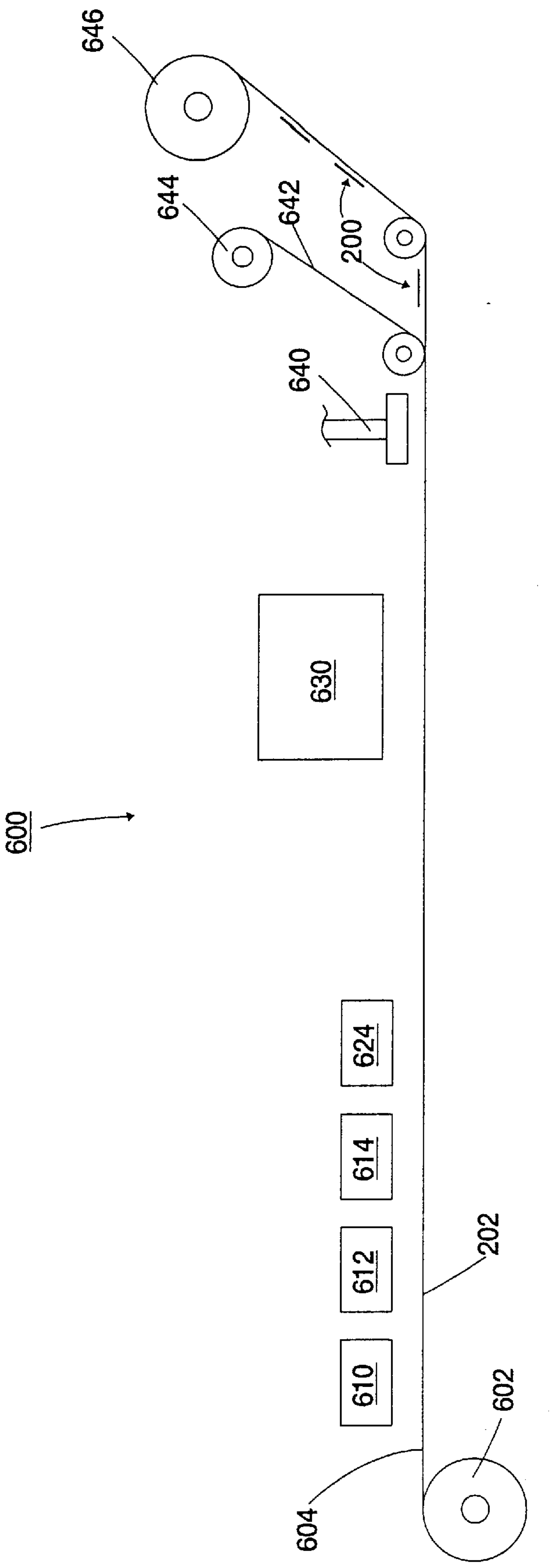
FIG. 11 is a schematic diagram of an apparatus for forming labels of the present invention according to a further alternative method.

With reference to FIG. 11, an apparatus 600 is shown for forming labels 200 according to the second embodiment, labels 250 according to the third embodiment, labels 290 according to the fourth embodiment, or labels 300 according to the fifth embodiment, the configuration of the hangers and foot portions again being as described for either of the first, second, third, or fourth embodiments. Elements 602, 604,

610, 612, 614, and 624 correspond to elements 502, 504, 510, 512, 514, and 524 of apparatus 500, respectively, and perform the same functions. However, whereas the second method required the marrying of two webs, in the third method the hangers and foot portions are preformed and individually applied to the upper surface of base web 604. More particularly, the hangers and foot portions are applied so that the foot portions engage the adhesive patches laid by adhesive screen printer 624 and are permanently adhered to base web 604 thereby. Thereafter, elements 640, 642, 644, and 646 which correspond to elements 540, 542, 544, and 546, respectively, execute the same operations as described with respect to the second method.

Turning to the application of the hangers and foot portions in more detail, hanger/foot portion applicator 630 may be any suitable apparatus or mechanism. Suitable machines are available from MGS Machine of Minneapolis. Alternatively, the individual hangers/foot portions may be applied by hand.

As an alternative to the method just described, the adhesive may be applied to the underside of the foot portions of the preformed hanger/foot portions prior to application to the upper surface of the base web. In this case, adhesive screen printer 624 is not needed.

Figure 12:
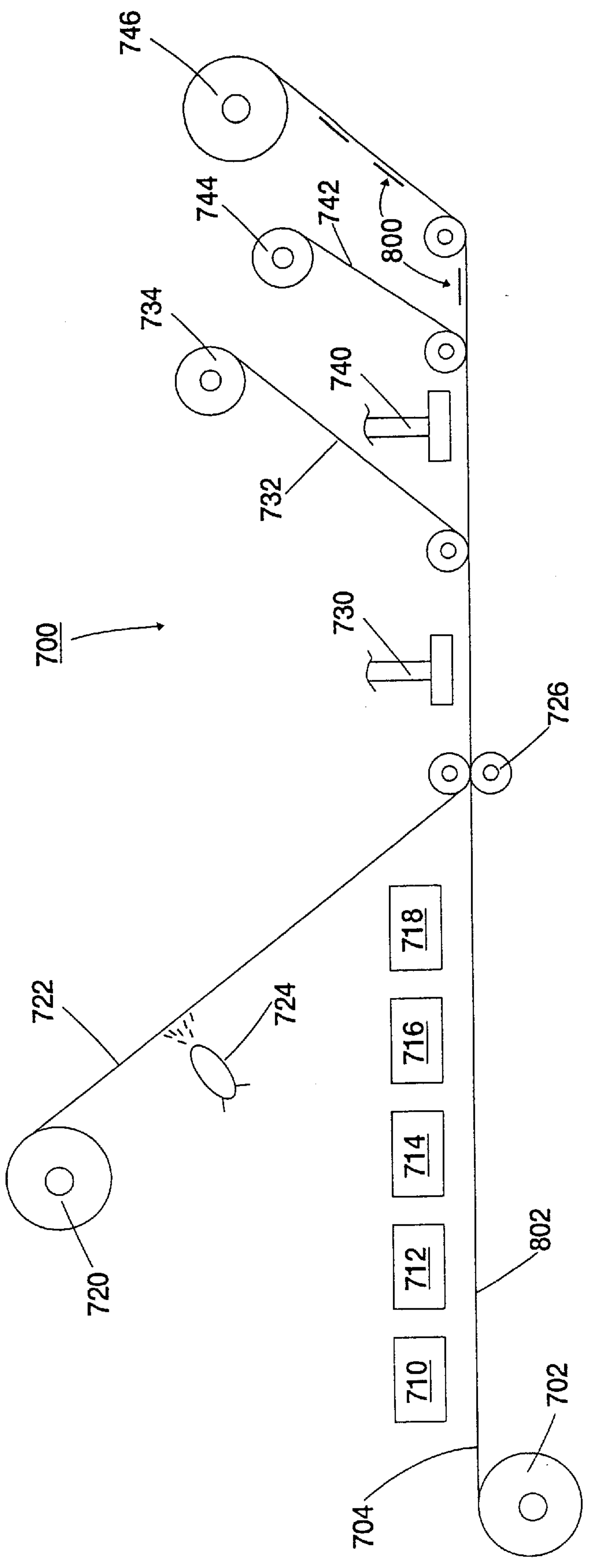
FIG. 12 is a schematic diagram of an apparatus for forming labels of the present invention according to a further alternative method.

With reference to FIG. 12, an apparatus 700 for forming labels 800 according to a fourth method is shown therein. Labels 800 differ from any of labels 100, 200, 250, 290, and 300 only in that the undersurfaces of the hangers are coated with deadened adhesive. Elements 702, 704, 711, 712, 714, 716, and 718 of apparatus 700 correspond to elements 402, 404, 410, 412, 414, 416, and 418 of apparatus 400, respectively, and perform the same functions in the same manner. Web 722 differs from web 422 in that it is coated entirely on its under surface with pressure sensitive adhesive. If the self adhesive web 722 is first disposed on a release liner, the release liner is removed. Web 722 is unwound from unwinding station 720. Adhesive deadener applicator 724 applies adhesive deadener to the web in a band corresponding to the non-adhesive zone 114 of label 100. Deadening agents suitable for this purpose include product number FM1512 from K & W Printing, Inc. of Franklin Park, Ill. Thereafter, elements 730, 732, 734, 740, 742, 744, and 746, corresponding to elements 430, 432, 434, 440, 442, 444, and 446 of apparatus 400, respectively, perform the same functions and in the same manner as discussed with regard to FIG. 8 and the first method.

It will be appreciated that labels incorporating any of the above described hanger and foot portion configurations may be formed using any of the above noted methods. Moreover, more than two legs may be secured to a single foot portion as shown with regard to label 300. For example, all of the legs of a given label according to the present invention may be secured to a single continuous strip extending along the lower longitudinal edge of the label. In this case, the gaps between the foot portions would be eliminated. However, if the gaps are eliminated, other provision must be made for removing the portions of the upper web defined within the hangers or otherwise this portion will remain with the finished label.

Each of the labels as described above may be produced "multiple up" on a web. That is, a plurality of labels may be formed across a relatively wide web which may thereafter be slit into individual webs.

Either the upper surfaces or the lower surfaces of the hangers may be printed on. Preferably, the hanger material is clear. In this way, if the hanger is not printed, the base label may be printed without regard for the placement of the hanger in either of the stored or operative positions.

It will be appreciated that the designs of each of the above described labels facilitate the grasping of the hangers by end users to lift the hangers up into the hanging position. Because hangers have predefined peripheries, not surrounded by or formed in a larger piece of film, the user may access the undersides of the hangers by simply sliding a fingernail along the upper surface of the respective base label until the fingernail is wedged beneath an edge of the hanger. In particular, the pull tabs are configured to allow this method of opening, the tab of the base label having a margin extending beyond and about the edge of the pull tab of the hanger.

Figure 13:
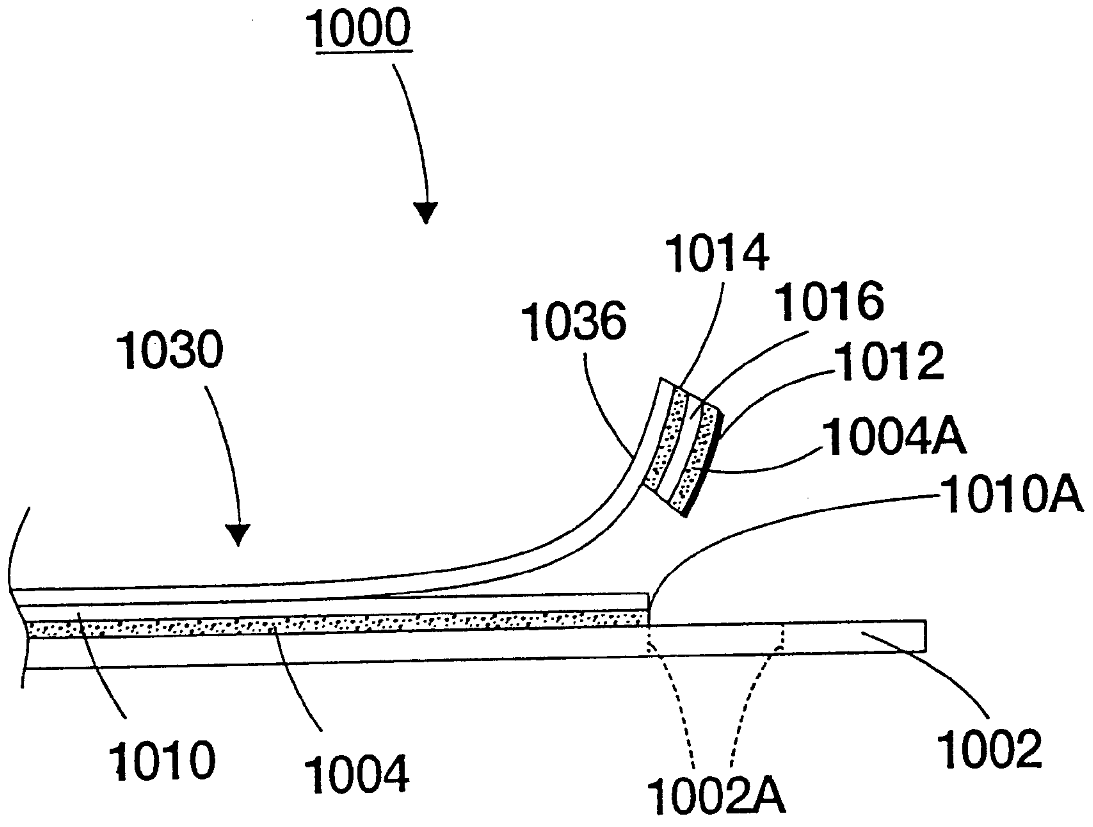
FIG. 13 is a fragmentary, side elevational view of a label incorporating an alternative pull tab design.
Figure 14:
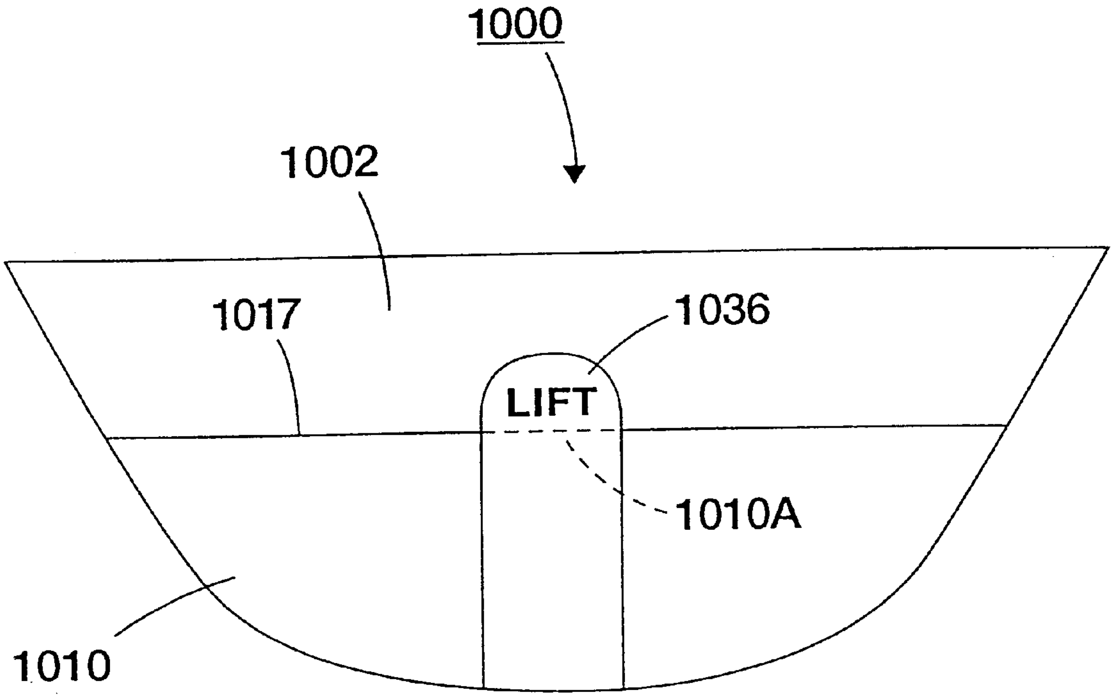
FIG. 14 is a fragmentary, top plan view of the label incorporating the alternative pull tab design.

With reference to FIGS. 13 and 14, an alternative pull tab configuration is shown therein which likewise provides for lifting. This pull tab design may be used in place of any of the pull tabs discussed above, with appropriate modifications to the manufacturing process as will be appreciated by those of ordinary skill in the art upon reading the description which follows.

A label 1000 disposed on release liner 1002 has a anger 1030 with a pull tab 1036 corresponding to pull tab 136 of the first embodiment. As best seen in FIG. 14, rather than there being a base tab underlying tab 1036 which has a margin extending beyond tab 1036, base tab 1016 is coextensive with the portion of pull tab 1036 extending beyond the upper edge 1017 of base label 1010. Base tab 1016 is separated from the remainder of base label 1010 by cut line 1010A and is adhered to the underside of pull tab 1036 by pressure sensitive adhesive 1014. The underside of base tab 1016 is coated with pressure sensitive adhesive 1004A which has been deadened by an adhesive deadener or varnish 1012. Suitable adhesive deadeners and varnishes include Radcure 800 available from Radcure Corporation of Livingston, N.J. Preferably, suitable indicia such as "LIFT" is printed on the upper surface of base tab 1016 and is visible through pull tab 1036.

From the foregoing, it will be appreciated that label 1000 is removable from the release liner in the same manner as described with regard to the other embodiments and the deadened adhesive 1004A will readily separate from the liner. Once the label is affixed to a desired container by means of adhesive 1004, tab 1036 may be lifted away to employ hanger 1030, the deadened adhesive 1004A not forming a bond with the container. It will be appreciated that, because the periphery of pull tab 1036 is free and not surrounded by a layer of film or the like, that pull tab 1036 is easily accessible for lifting by the user. In particular, base tab 1016 secured to pull tab 1036, and otherwise free of the label and the container, spaces pull tab 1036 somewhat from the surface of the container so that it is even more easily accessible.

Any of the aforedescribed labels may be formed having a pull tab structure as described immediately above. The methods and apparatus would be modified in the following manner. Prior to applying the top web or preformed hanger/foot portions to the base web, the face stock of the base web is delaminated from the release liner 1002 and adhesive deadener 1012 is applied to the adhesive on the underside of the face stock at locations corresponding to pull tabs 1036. The adhesive deadener may be applied as a continuous, longitudinal strip the lower edge of which corresponds to the upper edge 1017 of the labels ultimately formed. The face stock is then relaminated to the release liner. Adhesive 1014 is provided by applying, or providing a top web having, pressure sensitive adhesive at locations corresponding to pull tab 1036. The adhesive may be applied as a continuous, longitudinal strip the lower edge of which is disposed at or above the upper edge 1017 of the labels ultimately formed. Alternatively, the adhesive may be selectively applied. As a further alternative, the web may be pre-coated with adhesive, and adhesive deadener applied to the web below a line corresponding to edge 1017. As yet another alternative, adhesive may be applied as a strip or selectively onto the surface of the base web at locations corresponding to pull tabs 1036. After the adhesive is applied, the top web is married with the bottom web or the preformed hanger/foot portions are applied to the bottom web as described above. In addition to the previously described die cutting operations, a bottom die cutter is used to form at least cut line 1010A, and preferably to define the periphery of adhesive 1014, base tab 1016, adhesive 1004A, and deadener 1012. In doing so, the bottom die cutter will also form cut lines 1002A in the release liner. The bottom die cutter may also cut upwardly through a portion of the top web or preformed hanger/foot portion (though not at the area overlying cut line 1010A) to define the periphery of pull tab 1036. Suitable bottom die cutters are well known in the art and are available from Rotometric of Eureka, Mo. The remainder of the formation process is as discussed with regard to the other embodiments of the invention.

Figure 15:
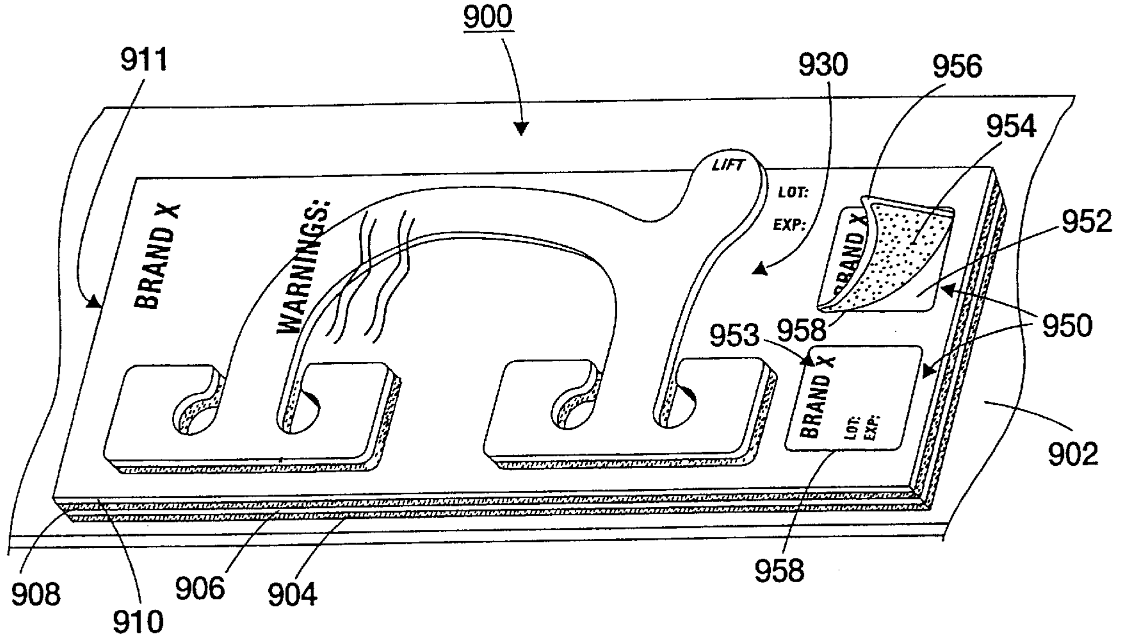
FIG. 15 is a perspective view of a label according to a sixth embodiment, the label including removable, secondary labels.

With reference to FIG. 15, a label 900 according to a sixth embodiment is shown therein having secondary removable labels 950. It will be appreciated from the following that any of the above described label designs may be modified to include this feature.

Label 900 is releasably secured to release liner 902 by pressure sensitive adhesive 904. Intermediate face stock layer 906 is coated on its lower surface with adhesive 904 and on its upper surface with pressure sensitive adhesive 908. Base face stock layer 910 is adhered to the upper surface of intermediate layer 906 by adhesive 908. Layers 904, 906, 908, and 910 together form base label 911. Hanger 930 is attached to the upper surface of base layer 910. Secondary labels 950 are defined by cut lines 958 formed in base layer 910 and down to the upper surface of intermediate layer 906. The upper surface of intermediate layer 906 underlying labels 950 is coated with varnish 952. Suitable varnishes include Product No. L075 available from Paragon Inc., Ltd. of Boxburn, Scotland. Substantially the remainder of the upper surface of intermediate layer 906 is not covered with varnish so that the overlying portions of base layer 910 are permanently secured thereto by adhesive 908.

Each of the secondary labels 950 includes a face stock layer 956 (i.e., the portion of base label 910 defined within cut lines 958) and a layer of pressure sensitive 954 (i.e., the portion of adhesive layer 908 underlying face stock layers 956). In use, label 900 may first be affixed to a desired container by means of adhesive 904. Thereafter, the user may remove one or more of secondary labels 950 and reattach them to another object, such as a patient history chart, by means of adhesive 954. Secondary labels 950 are provided with indicia 953 representing information regarding the product in the container. In this way, the use and characteristics of the product packaged in the container may be conveniently and accurately tracked.

Figure 16:
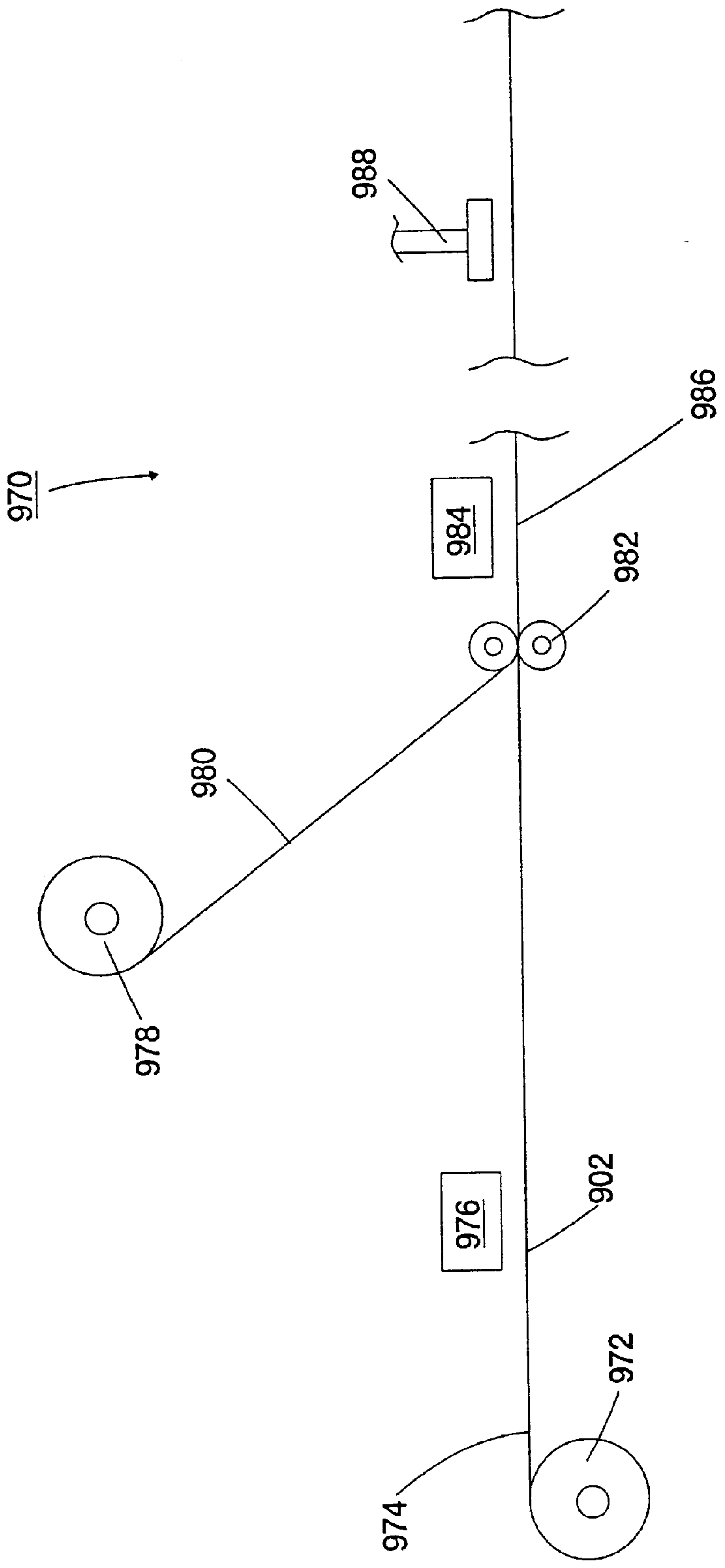
FIG. 16 is a fragmentary, schematic diagram showing an apparatus for forming labels according to the sixth embodiment.

With reference to FIG. 16, labels 900 may be formed according to any of the methods as described above with the following additional steps using apparatus 970. A first pressure sensitive web 974 is unwound from unwind station 972. First web 974 includes release liner 902. Varnish corresponding to varnish 952 is applied by varnish application station 976 to the upper surface of first web 974 and may thereafter be cured if needed. Thereafter, second web 980 corresponding to base layer 910 and adhesive 908 is unwound from unwind station 978 and married to first web 974 (including release liner 902) by nip rollers 982, thereby forming composite web 986. Indicia 953 is printed on the upper surface of web 986 by print station 984. Print station 984 may be the same print station as used to print other indicia on the upper surface of base label 910. Die cut station 988 forms cut lines 958 down through top web 980 down to the upper surface of bottom web 974. Die cut station 988 may be combined with the die cutter used (if any) to form hanger 930 and the foot portions, or, alternatively, the die cutter used to form the base label 911. Alternatively, die cut station 988 may be a separate die cutter.

Figure 17:
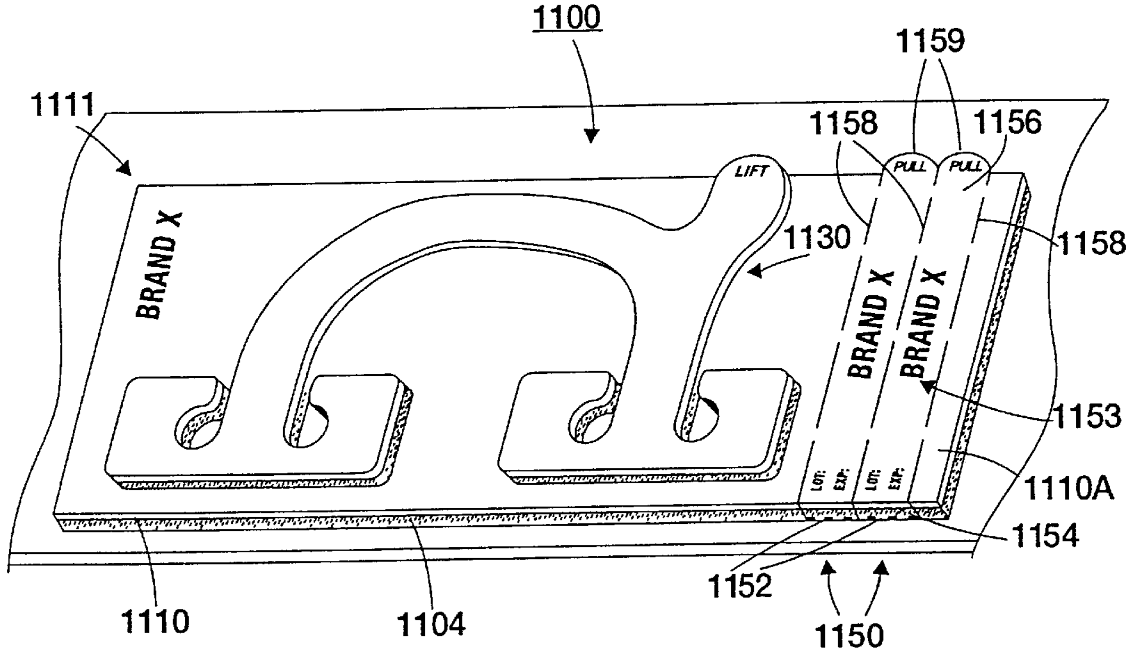
FIG. 17 is a perspective view of a label according to a seventh embodiment, the label including removable, secondary labels.

With reference to FIG. 17, a label 1100 according to a seventh embodiment is shown therein disposed on a release liner 1102. Label 1100 is similar to label 900 according to the sixth embodiment in that label 1100 includes removable secondary labels 1150. However, the configuration of the secondary labels 1150 is different, and further, base label 1111 of label 1100 is "single ply" as will be appreciated from the following description.

Turning to the construction of label 1100 in greater detail, label 1100 includes base label 1111 having hanger 1130 secured to the upper surface thereof by foot portions. The hanger and foot portions may be configured and secured to the base label as discussed for any of the foregoing embodiments. Base label 1111 includes base face stock layer 1110 coated on its rear surface with pressure sensitive adhesive 1104. Perforation lines 1158 are formed through base layer 1110 and adhesive layer 1104 down to release liner 1102. Perforation lines 1158 define secondary labels 1150 therebetween and marginal portion 110A adjacent the end edge of the base label. Notably, perforations 1158 include ties or bridges 1158A. Preferably, the cuts of perforations 1158 are on the order of a quarter inch in length with the ties 1158A each being about 1/32 of an inch in length. Each secondary label 1150 includes a face stock layer 1156 forming a part of base layer 1110 and is coated on its under surface with a portion of adhesive 1104 denoted 1154. Secondary labels 1150 have indicia 1153 printed thereon.

The lower surface of adhesive 1154 is pattern coated with adhesive deadener 1152. Suitable adhesive deadeners include Radcure 800 as discussed above. Adhesive 1154 is pattern coated with the adhesive deadener such that a reduced portion of activated or tacky adhesive is exposed. The pattern of adhesive deadener may be selectively chosen for the intended application. For example, a striped, checkered, or diffuse patterns may be used. The adhesive on the undersurface of pull tabs 1159 is preferably fully coated with adhesive deadener.

In use, label 1100 may be applied to a suitable container using conventional methods such as automated application equipment. As the label is being delaminated from the release liner and applied to the container, ties 1158A serve to hold the label together. Once applied to the container, all of base layer 1110 (including marginal portion 1110A) except secondary labels 1150 is permanently adhered to the container by adhesive 1104. Secondary labels 1150 are releasably secured to the container, the reduced adhesive surface in contact with the container allowing the removable labels to be peeled away. The proportions of deadened and exposed adhesive underlying the secondary labels, the characteristics of adhesive 1154, and the preferred pattern of adhesive deadener will depend on the intended application and the intended substrates. Preferably, however, from about 40% to about 60% of the adhesive 1154 is coated with adhesive deadener 1152. Each of secondary labels 1150 may be removed by grabbing its respective pull tab 1159 which, because it is fully coated with adhesive deadener, is not secured to the container. In some applications, it may be desirable to fully coat with adhesive deadener only down to the upper edge of the base layer, while in other applications it may be desirable to apply a full coat of adhesive deadener further down along the secondary labels 1150 to give the user a better start in peeling the secondary label away. The secondary label 1150 may then be applied to another desired object, for example a patient's record chart. The exposed adhesive 1154 serves to secure the secondary label to the new substrate.

Figure 18:
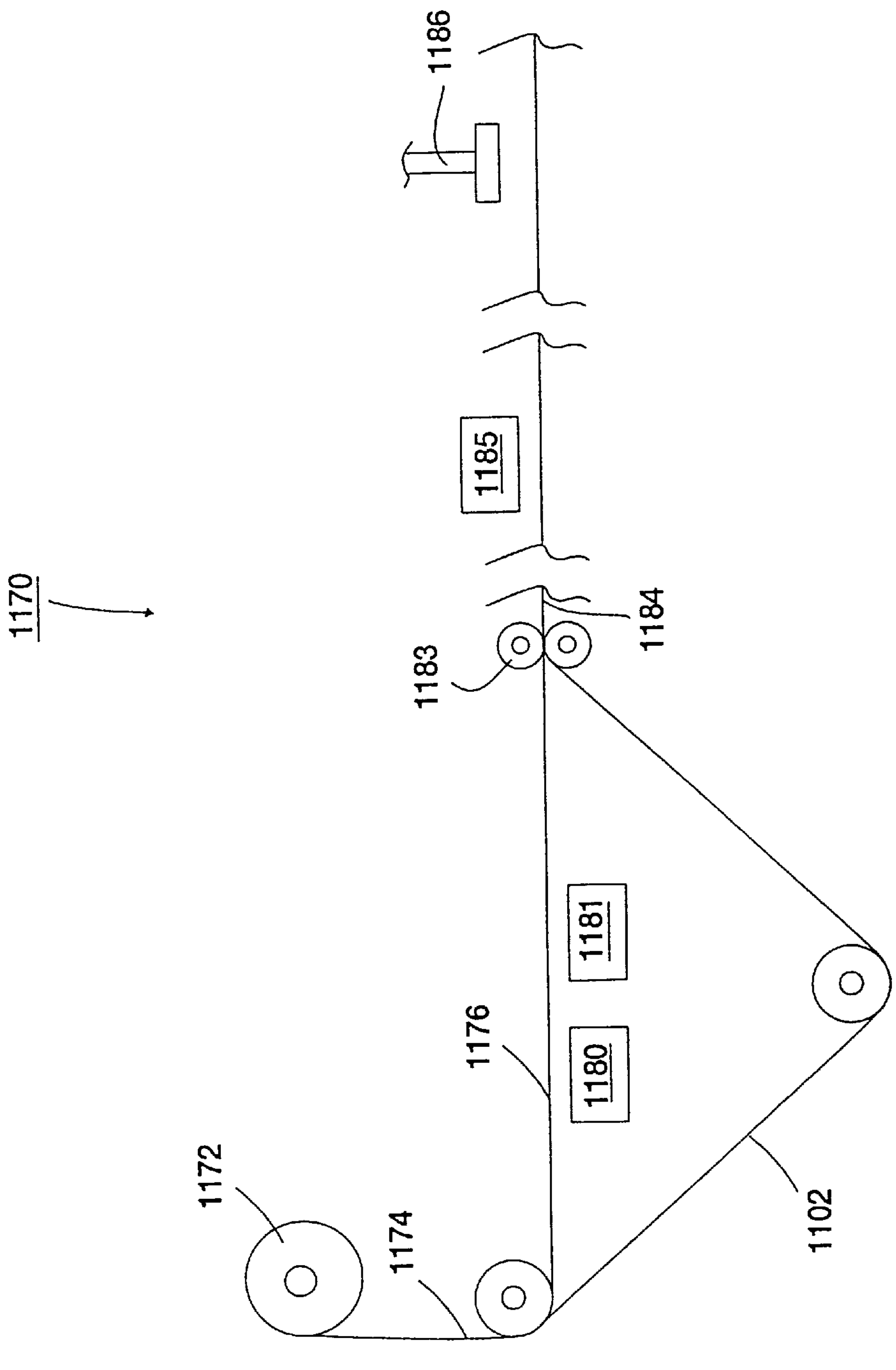
FIG. 18 is a fragmentary, schematic diagram showing an apparatus for forming labels according to the seventh embodiment.

With reference to FIG. 18, an apparatus 1170 for forming labels 1100 is shown therein. First, a self adhesive face stock 1174 including release liner 1102 is unwound from unwind station 1172. Release liner 1102 is delaminated from self adhesive face stock 1176 by a suitable arrangement of rollers. Print station 1180 applies adhesive deadener 1152 (see FIG. 17) to the adhesive surface of web 1176 at locations corresponding to secondary labels 1150. Adhesive deadener print station 1180 is preferably a flexographic printing station. However, station 1180 may be any suitable printing means, for example, a slot coater as available from Nordson Corporation, or a screen printer. Curing station 1181 thereafter cures adhesive deadener 1152. Release liner 1102 is then relaminated to the self adhesive surface of face stock 1176 by nip rollers 1183 to form composite web 1184. Indicia 1153 is printed on the top surface of web 1184 by print station 1185. Print station 1185 may be the same print station as used to print the other indicia on base layer 1110 or a further print station. Die cut station 1186 forms perforations 1158. Die cut station 1186 may be the same die cut station as used to form base labels 1111 or hangers 1130, or a further die cut station. The apparatus and methods for forming labels 1100 are otherwise as discussed above for any of the aforedescribed embodiments.

Figure 19:
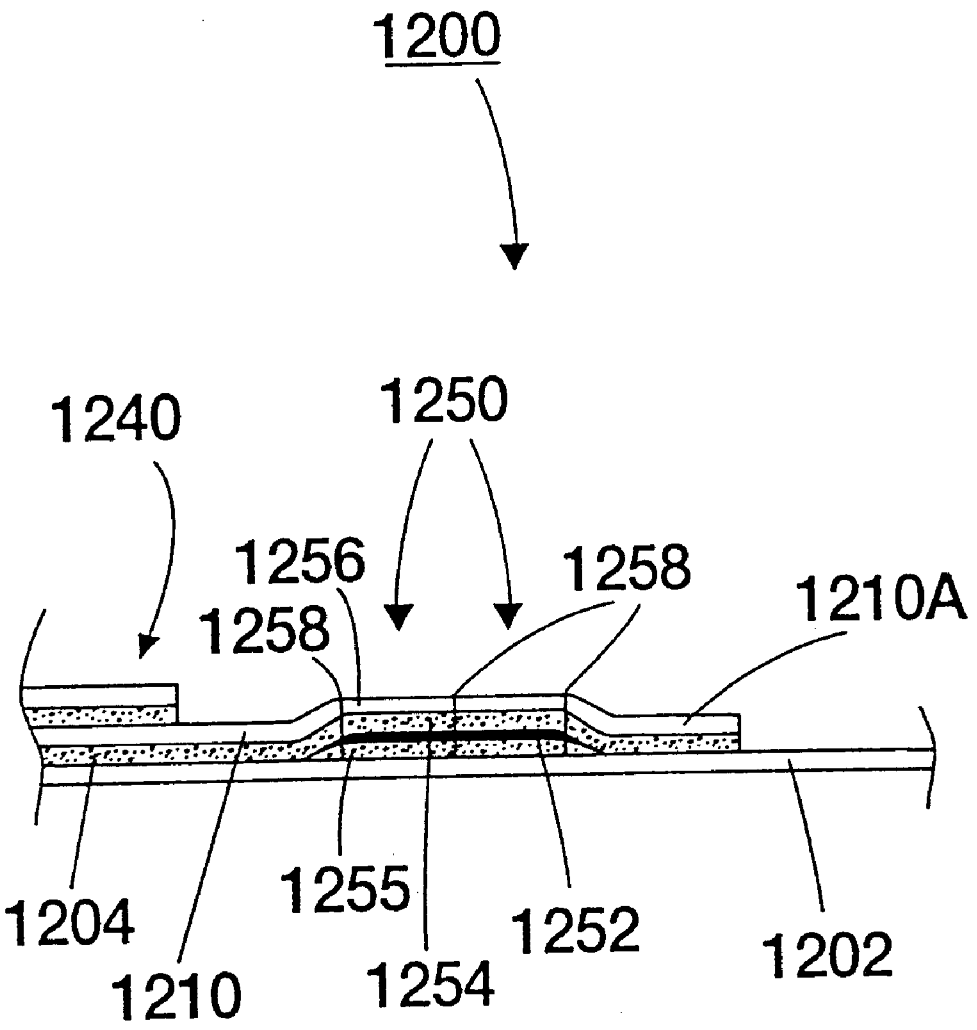
FIG. 19 is a fragmentary, side elevational view of a label according to an eighth embodiment, the label including removable, secondary labels.

With reference to FIG. 19, a fragmentary view of a label 1200 according to an eighth embodiment of the present invention is shown therein disposed on a release liner 1202. Label 1200 is substantially the same as label 1100 as discussed above except in the manner the secondary labels 1250 are secured to the release liner 1202 and any intended substrates such as a container or a patient record chart. More particularly, label 1200 includes base face stock layer 1210 including marginal portion 1210A. Base layer 1210 is coated on its undersurface with pressure sensitive adhesive 1204. A hanger (not shown) is secured to the upper surface of base layer 1210 by foot portions 1240 in any of the manners as discussed above. Each secondary label 1250 includes a face stock layer 1256 coated on its undersurface with adhesive 1254 formed from adhesive layer 1204. Whereas the adhesive on the undersurfaces of secondary labels 1150 is only pattern coated with adhesive deadener, adhesive 1254 is fully (i.e., flood) coated with adhesive deadener 1252. Adhesive deadener 1252 may be Radcure 800. The lower surface of adhesive deadener layer 1252 is in turn coated with adhesive 1255. Adhesive 1255 is preferably a low tack adhesive. In particular, adhesive 1254 should have stronger adhesion to adhesive deadener 1252 than adhesive 1255. Preferably, adhesive 1255 is a totally or easily removable, low tack, hot melt, pressure sensitive adhesive, such adhesives being commonly available. Suitable adhesives for adhesive 1255 include product number H2355-01 available from Findley Adhesives, Inc. of Wauwatosa, Wis. Secondary labels 1250 are defined by cut lines 1258 which extend down to release liner 1202.

Label 1200 and secondary labels 1250 may be used in substantially the same manner as discussed above with regard to label 1100 and secondary labels 1150. However, whereas the pattern coating of adhesive deadener allows secondary labels 1150 to be removed from the container, it is the nature and characteristics of adhesive 1255 which allow secondary labels 1250 to be peeled away from the container. Likewise, whereas the pattern coating of adhesive deadener on secondary labels 1150 allows them to be readhered to a second substrate such as a doctor's chart, it is again the nature and characteristics of adhesive 1255 which allow secondary labels 1250 to be readhered to a second substrate.

Figure 20:
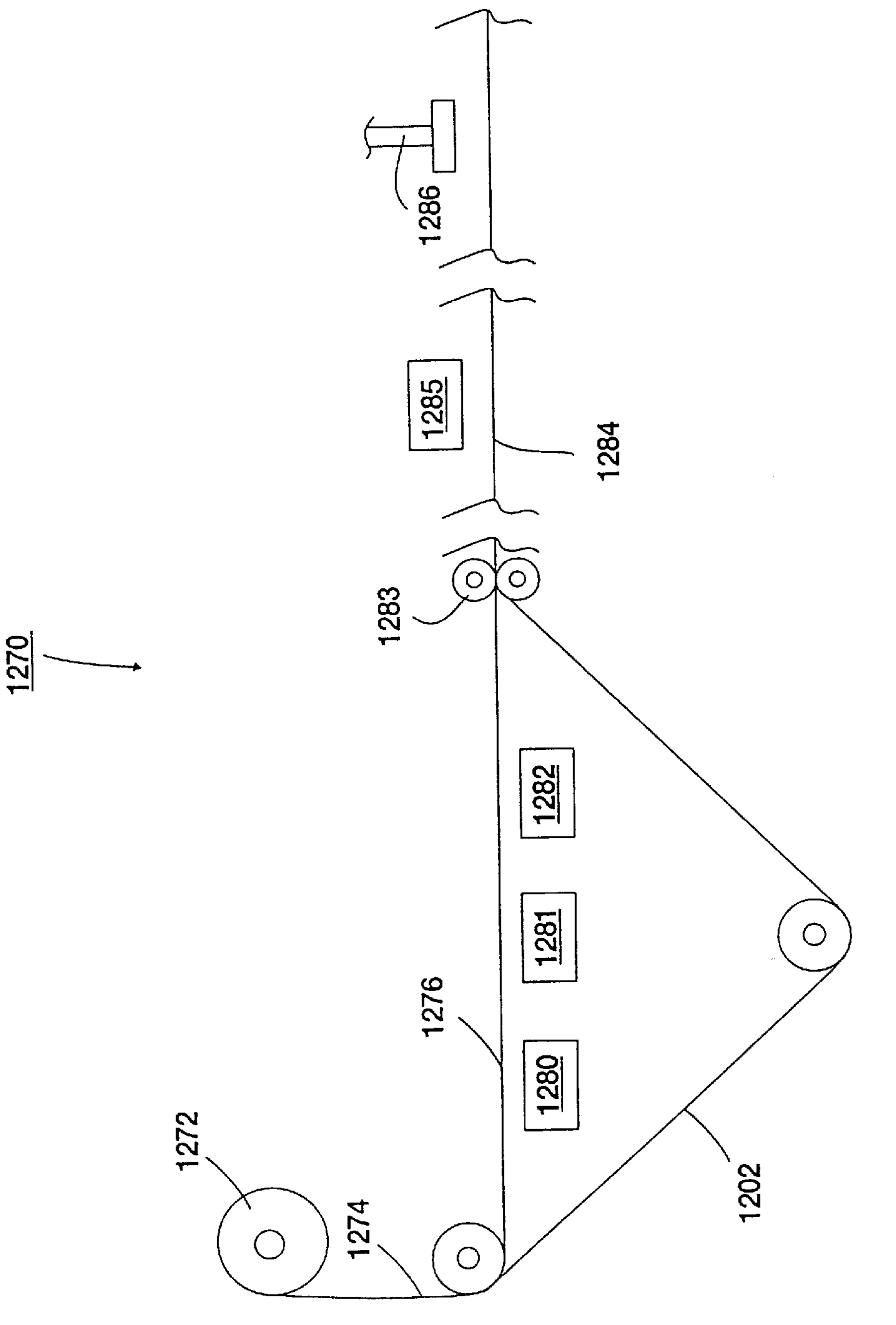
FIG. 20 is a fragmentary, schematic diagram of an apparatus for forming labels according to the eighth embodiment.

Turning to FIG. 20, an apparatus 1270 for forming labels 1200 is shown therein. A self adhesive face stock 1274 disposed on release liner 1202 is unwound from unwind station 1272. Release liner 1202 is delaminated from self adhesive face stock 1276. Adhesive deadener 1252 is flood coated by printing station 1280 onto the adhesive of web 1276 at locations corresponding to secondary labels 1250. The adhesive deadener is then cured at curing station 1281. Adhesive 1255 is applied to the cured adhesive deadener by printing station 1282. Alternatively, adhesive 1255 may be applied to the release liner at locations corresponding to the secondary labels when the release liner is remarried to the self adhesive face stock. Release liner 1202 is then relaminated to the adhesive surface of web 1276 by nip rollers 1283 to form composite web 1284. Suitable indicia (not shown) corresponding to indicia 1153 of label 1100 is printed onto the face stock of web 1284 by printing station 1285. Print station 1285 may be the same print station as used to print other indicia on the base label, or alternatively, may be a separate print station. Die cutter 1286 forms perforations 1258. Die cutter 1286 may be the same die cutter as used to form the base labels or hangers of the labels, or alternative, may be a separate die cut station. The apparatus and methods for forming labels 1200 are otherwise as discussed above for any of the aforedescribed embodiments.

With reference again to FIG. 19, the label 1200 as shown therein may be modified to function in a different manner than discussed above. In the modified embodiment, coating 1252 which separates adhesive layers 1254 and 1255 is a release varnish such as, for example, product no. L075 from Paragon Ink of Boxburn, Scotland. Adhesive layer 1255, rather than being a low tack adhesive as described above, is a high tack adhesive. Suitable adhesives for adhesive 1255 include product no. 2203X Hot Melt Permanent Adhesive available from Fuller Adhesive. In particular, adhesive 1255 of the modified embodiment should have greater adhesion to varnish coating 1252 than adhesive 1254.

When modified label 1200 is applied to a container, secondary labels 1250 are removably secured thereto by adhesive 1255. When a secondary label 1250 is pulled upwardly away from the remainder of the label, adhesive 1254 separates from varnish coating 1252. Adhesive layer 1255 and varnish coating 1254 will remain with the container. This is because the adhesion between adhesive 1255 and the container and the adhesion between adhesive 1255 and varnish coating 1254 are greater than the adhesion between adhesive 1254 and varnish coating 1252. The secondary label 1250 once removed will have exposed adhesive 1254 on the underside thereof by which it may be secured to a further substrate such as a patient's record chart.

It will be appreciated that the modified label 1200 as just described may be formed according to the same method and using the same apparatus as described above with respect to the originally described label 1200. The only modifications which need to be made to the methods and apparatus would be the substitution of the high tack adhesive for the low tack adhesive and the substitution of the release varnish for the adhesive deadener.

While a preferred embodiment of the present invention has been described, it will be appreciated by those of skill in the art that certain modifications may be made without departing from the scope of the present invention. For example, the upper edge of the hanger of any of the above noted designs may intersect with the top edge of the label. All such modifications are intended to come within the scope of claims which follow.

What is claimed is:

1. A method for forming a label for displaying information regarding a container and suspending the container from a support, said method comprising the steps of:

a) providing a base web having an upper surface, a lower surface, and a base adhesive coating the lower surface thereof;

b) selectively applying a release varnish to the upper surface of the base web;

c) marrying a top web having a lower surface and an adhesive strip coating a portion of the lower surface of the top web to the base web such that the adhesive strip engages the varnish on the upper surface of the base web;

d) cutting the top web down to the base web to form a hanger therein; and e) cutting through the base web to form a base label therein.

2. The method of claim 1 further including the step of applying the adhesive strip to the top web prior to marrying the top web to the base web.

3. The method of claim 1 including the step of removing a top web waste matrix following the step of cutting the top web.

4. The method of claim 3 wherein the step of cutting the top web to form the hanger includes forming a hanger having at least two spaced apart legs, and wherein said step of removing the top web waste matrix includes removing an interior waste portion forming a part of the top web and defined between the legs of the hanger.

5. The method of claim 4 wherein said step of cutting the top web further includes forming a continuous longitudinal strip forming a part of the top web, and a gap portion forming a part of the top web and defined between ends of the legs, the interior waste portion being connected to the continuous strip by the gap portion, and wherein the step of removing the top web waste matrix includes pulling the continuous strip away from the base web, whereby the interior waste portion is pulled away therewith.

6. The method of claim 1 further including the step of removing a base web waste matrix following the step of cutting the base web.

7. The method of claim 1 further including the step of printing on the base web.

8. The method of claim 1 further including the steps of:

adhering a pull portion of the hanger to the upper surface of an adjacent, backing portion of the base web disposed adjacent the pull portion; and cutting through the base web along the backing portion and up to the hanger such that the backing portion is separable from the remainder of the base web and the backing portion is secured to the pull portion of the hanger.

9. A method for forming a label for displaying information regarding a container and suspending the container from a support, the method comprising the steps of:

a) providing a base web having an upper surface, a lower surface, and an adhesive coating on the lower surface thereof;

b) selectively applying an adhesive patch to one of the upper surface of the base web and a lower surface of a top web;

c) marrying the base web with the top web such that the lower surface of the top web engages the upper surface of the base web;

d) cutting the top web down to the base web to form a hanger therein; and e) cutting through the base web to form a base label therein.

10. The method of claim 9 wherein said step of selectively applying the adhesive patch includes screen printing the adhesive patch onto the upper surface of the base web.

11. The method of claim 9 further including the step of removing a top web waste matrix following the step of cutting the top web.

12. The method of claim 11 wherein the step of cutting the top web to form the hanger includes forming a hanger having at least two spaced apart legs, and wherein said step of removing the top web waste matrix includes removing an interior waste portion forming a part of the top web and defined between the legs of the hanger.

13. The method of claim 12 wherein said step of cutting the top web further includes forming a continuous longitudinal strip forming a part of the top web, and a gap portion forming a part of the top web and defined between ends of the legs, the interior waste portion being connected to the continuous strip by the gap portion, and wherein the step of removing the top web waste matrix includes pulling the continuous strip away from the base web, whereby the interior waste portion is pulled away therewith.

14. The method of claim 9 further including the step of removing a base web waste matrix following the step of cutting the base web.

15. The method of claim 9 further including the step of printing on the base web.

16. The method of claim 9 further including the steps of:

adhering a pull portion of the hanger to the upper surface of an adjacent, backing portion of the base web disposed adjacent the pull portion; and cutting through the base web along the backing portion and up to the hanger such that the backing portion is separable from the remainder of the base web and the backing portion is secured to the pull portion of the hanger.

17. A method for forming a label for displaying information regarding a container and suspending the container from a support, the method comprising the steps of:

a) providing a base web having an upper surface, a lower surface, and an adhesive coating on the lower surface thereof;

b) applying an adhesive patch to at least one of the upper surface of the base web and a connector strip forming a part of a pre-formed hanger/connector strip piece;

c) applying the pre-formed piece to the base web such that the connector strip is adhered to the upper surface of the base web by the adhesive patch; and d) cutting through the base web to form a base label therein.

18. The method of claim 17 further including the step of removing a base web waste matrix following the step of cutting the base web.

19. The method of claim 17 further including the step of printing on the base web.

20. The method of claim 17 wherein the pre-formed hanger/connector strip piece is applied to the upper surface of the base web using automatic application equipment.

21. The method of claim 17 wherein the pre-formed hanger/connector strip piece is applied to the upper surface of the base web by hand.

22. The method of claim 17 wherein the step of applying the adhesive patch includes applying adhesive to the connector strip.

23. The method of claim 17 wherein the step of applying the adhesive patch includes applying the adhesive patch to the upper surface of the base web.

24. The method of claim 17 wherein the step of applying the adhesive patch to the base web includes screen printing the adhesive patch onto the upper surface of the base web.

25. The method of claim 17 wherein the step of applying an adhesive patch includes applying a plurality of adhesive patches for each hanger/connector strip piece to one of the upper surface of the base web and a plurality of foot portions forming a part of the connector strip.

26. The method of claim 17 further including the steps of:

adhering a pull portion of the hanger to the upper surface of an adjacent, backing portion of the base web disposed adjacent the pull portion; and cutting through the base web along the backing portion and up to the hanger such that the backing portion is separable from the remainder of the base web and the backing portion is secured to the pull portion of the hanger.

27. A method for forming a label for displaying information regarding a container and suspending the container from a support, said method comprising the steps of:

a) providing a base web having an upper surface, a lower surface, and a base adhesive coating the lower surface thereof;

b) selectively applying a release varnish to the upper surface of the base web;

c) providing a top web having a lower surface a second adhesive layer disposed on the lower surface of the top web;

d) selectively applying an adhesive deadener to a portion of the second adhesive;

e) marrying the base web and the top web such that the lower surface of the top web faces the upper surface of the base web, the second adhesive layer being interposed therebetween;

f) cutting the top web down to the base web to form a hanger therein; and g) cutting through the base web to form a base label therein.

28. The method of claim 27 further including the step of removing a top web waste matrix following the step of cutting the top web.

29. The method of claim 28 wherein the step of cutting the top web to form the hanger includes forming a hanger having at least two spaced apart legs, and wherein said step of removing the top web waste matrix includes removing an interior waste portion forming a part of the top web and defined between the legs of the hanger.

30. The method of claim 29 wherein said step of cutting the top web further includes forming a continuous longitudinal strip forming a part of the top web, and a gap portion forming a part of the top web and defined between ends of the legs, the interior waste portion being connected to the continuous strip by the gap portion, and wherein the step of removing the top web waste matrix includes pulling the continuous strip away from the base web, whereby the interior waste portion is pulled away therewith.

31. The method of claim 27 further including the step of removing a base web waste matrix following the step of cutting the base web.

32. The method of claim 27 further including the step of printing on the base web.

33. The method of claim 27 further including the steps of:

adhering a pull portion of the hanger to the upper surface of an adjacent, backing portion of the base web disposed adjacent the pull portion; and cutting through the base web along the backing portion and up to the hanger such that the backing portion is separable from the remainder of the base web and the backing portion is secured to the pull portion of the hanger.

34. A method for forming a label for displaying information regarding a container and suspending the container from a support, said method comprising the steps of:

providing a base web having an upper surface and a lower surface, a base adhesive disposed on the lower surface for affixing the label to the container; mounting a hanger on the base web, the hanger defining an opening therein and having at least one end substantially permanently secured to the upper surface of the base web by at least one adhesive patch, the hanger mounted on the base web such that the hanger is foldable about the at least one end between a stored position wherein the hanger lies adjacent the upper surface of the base web and a hanging position wherein the hanger is folded away from the base web for receiving the support through the opening;

adhering a pull portion of the hanger to the upper surface of an adjacent, backing portion of the base web disposed adjacent the pull portion, the pull portion being spaced apart from the at least one end;

cutting through the base web along the backing portion and up to the hanger such that the backing portion is separable from the remainder of the base web and the backing portion is secured to the pull portion of the hanger; and cutting through the base web to form a base label therein.

35. The method of claim 34 wherein said hanger mounting step includes applying a top web to the upper surface of the base portion and cutting the top web down to the base web to form the hanger therein.

36. The method of claim 34 wherein said step of cutting through the base web to form a base label includes cutting through the hanger along the pull portion such that an edge of the pull portion is formed substantially coextensive with an edge of the base label.

37. The method of claim 34 including the step of printing indicia on the backing portion of the base web.

* * * * *